US010641051B1

(12) United States Patent
Gradwohl et al.

(10) Patent No.: US 10,641,051 B1
(45) Date of Patent: May 5, 2020

(54) SYSTEMS AND METHODS FOR COUPLING AND DECOUPLING DRILL HEADS FOR GROUND LOOP PREPARATION FOR GEOTHERMAL APPLICATIONS

(71) Applicant: Dandelion Energy, Inc., Palo Alto, CA (US)

(72) Inventors: Raymond Louis Gradwohl, Saratoga, CA (US); Jacques Gagne, Los Gatos, CA (US)

(73) Assignee: Dandelion Energy, Inc., Palo Alto, CA (US)

( * ) Notice: Subject to any disclaimer, the term of this patent is extended or adjusted under 35 U.S.C. 154(b) by 502 days.

(21) Appl. No.: 15/348,343

(22) Filed: Nov. 10, 2016

Related U.S. Application Data

(63) Continuation-in-part of application No. 15/258,302, filed on Sep. 7, 2016, now abandoned.

(51) Int. Cl.
*F24F 5/00* (2006.01)
*E21B 7/00* (2006.01)
*E21B 17/06* (2006.01)
*E21B 7/20* (2006.01)
*F24T 10/13* (2018.01)
*E21B 17/18* (2006.01)
*E21B 7/04* (2006.01)
(Continued)

(52) U.S. Cl.
CPC ............... *E21B 17/06* (2013.01); *E21B 7/20* (2013.01); *F24F 5/0046* (2013.01); *F24T 10/13* (2018.05); *E21B 7/04* (2013.01); *E21B 17/042* (2013.01); *E21B 17/18* (2013.01); *F24F 2005/0057* (2013.01); *F24T 2010/53* (2018.05)

(58) Field of Classification Search
CPC .......... E21B 17/06; E21B 7/20; E21B 17/042; E21B 7/04; E21B 17/18; F24T 10/13; F24T 2010/53; F24F 5/0046; F24F 2005/0057
USPC .......... 173/91, 211, 13, 14, 133; 175/21, 22, 175/23, 65, 19, 314, 293, 29
See application file for complete search history.

(56) References Cited

U.S. PATENT DOCUMENTS 1,894,446 A   1/1933 McKenny
1,896,105 A * 2/1933 Simmons .................. E21B 4/06
                                                            175/240

(Continued)

FOREIGN PATENT DOCUMENTS

WO      15175703 A1    11/2015
WO    2016070987 A1     5/2016

*Primary Examiner* — Benjamin F Fiorello
*Assistant Examiner* — Edwin J Toledo-Duran
(74) *Attorney, Agent, or Firm* — Fountainhead Law Group, P.C.

(57) ABSTRACT

The technology relates to systems and methods for creating openings in ground material in order to install ground loops for geothermal heating and cooling applications. As an example, a system for creating an opening in ground material may include a first drill head configured as a pipe pulling drill head and a second drill head configured for attachment with a boring tool. When attached to an end of a pipe, the first drill head is configured to pull the pipe into the opening in ground material. The second drill head may include a drilling portion and an opening opposite of the drilling portion, the opening including a first chamber that tapers towards a second chamber. The first drill head also includes a drilling end configured for a locking fit within the second chamber.

4 Claims, 28 Drawing Sheets

(51) Int. Cl.
*E21B 17/042* (2006.01)
*F24T 10/00* (2018.01)

(56) References Cited

U.S. PATENT DOCUMENTS

| | | | | |
|---|---|---|---|---|
| 1,896,492 A | * | 2/1933 | Macready | E21B 49/081 166/264 |
| 2,391,828 A | * | 12/1945 | Hood | E02D 5/665 405/222 |
| 2,906,244 A | * | 9/1959 | Christensen | B25D 9/145 173/133 |
| 4,117,895 A | | 10/1978 | Ward et al. | |
| 4,368,785 A | * | 1/1983 | Gondek | E21B 4/06 175/21 |
| 4,607,855 A | * | 8/1986 | Rohm | B23B 31/001 279/140 |
| 4,703,942 A | * | 11/1987 | Rohm | B23B 31/123 173/48 |
| 4,770,030 A | * | 9/1988 | Smith | E21B 25/00 73/84 |
| 5,095,998 A | * | 3/1992 | Hesse | E21B 4/145 173/133 |
| 5,313,825 A | * | 5/1994 | Webster | E02D 1/022 73/81 |
| 5,634,515 A | | 6/1997 | Lambert | |
| 5,984,596 A | * | 11/1999 | Fehrle | B25D 17/088 408/226 |
| 7,066,279 B2 | * | 6/2006 | Randa | E21B 4/145 173/91 |
| 7,093,677 B2 | * | 8/2006 | Hofmann | E21B 4/14 175/299 |
| 7,891,440 B2 | | 2/2011 | Roussy | |
| 8,136,611 B2 | | 3/2012 | Roussy | |
| 8,955,613 B2 | * | 2/2015 | Randa | E21B 7/26 173/211 |
| 2003/0116334 A1 | * | 6/2003 | Funfer | B25D 11/005 173/132 |
| 2004/0089473 A1 | * | 5/2004 | Kayes | E21B 4/145 175/19 |
| 2005/0006105 A1 | * | 1/2005 | Bell | E02D 7/30 166/381 |
| 2007/0017243 A1 | | 1/2007 | Kidwell et al. | |
| 2015/0300094 A1 | * | 10/2015 | Hisada | E21B 7/20 175/402 |

* cited by examiner

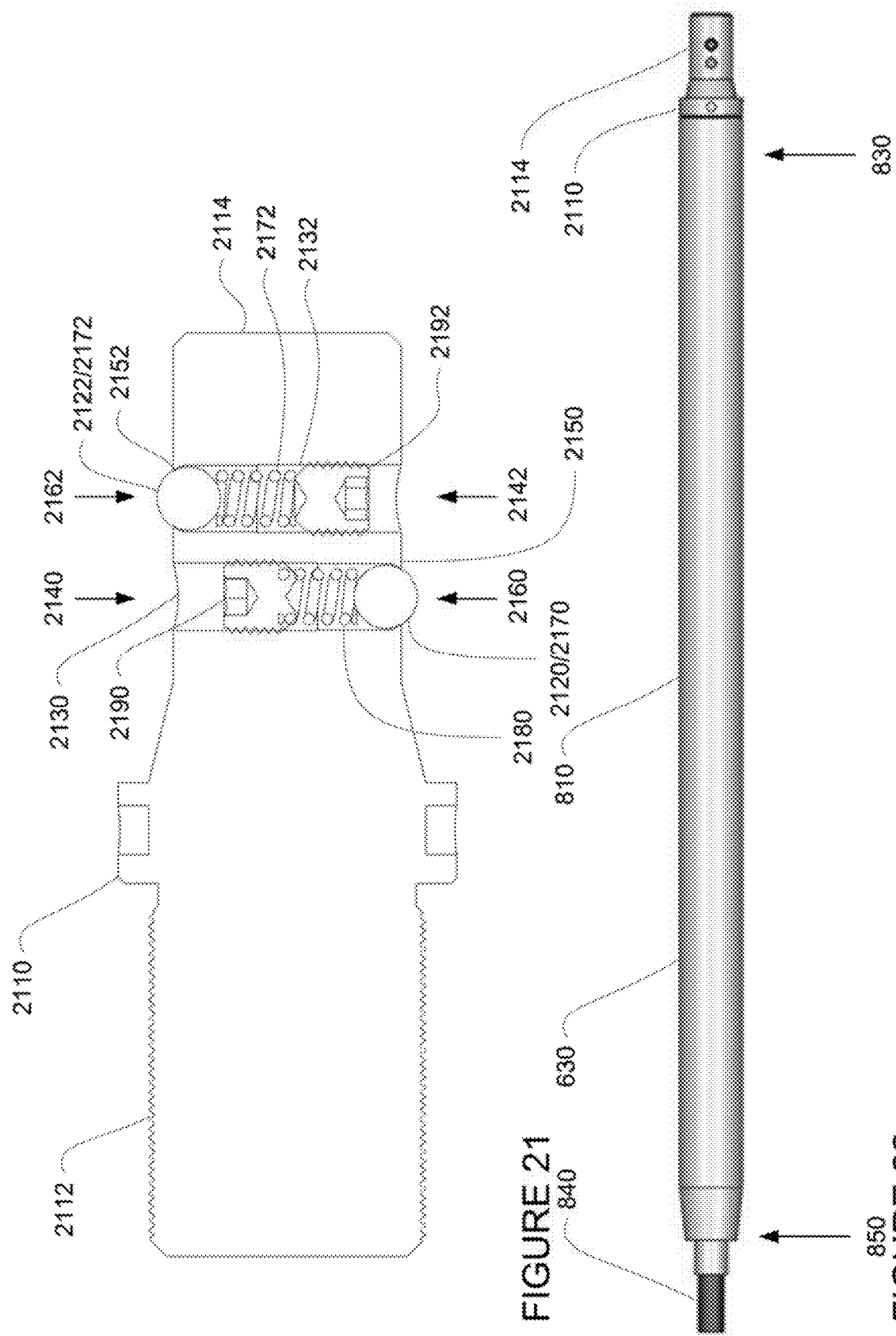

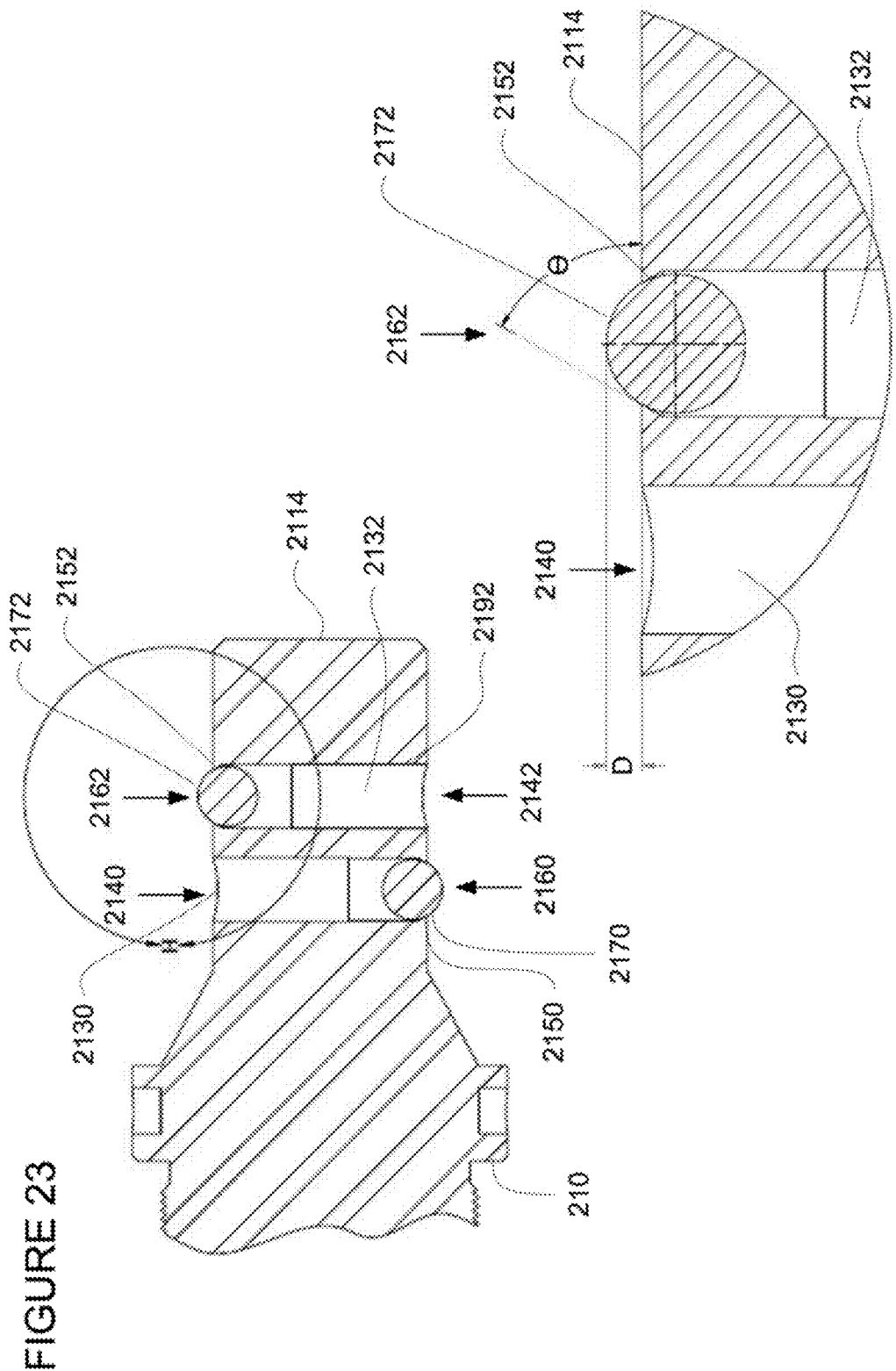

SYSTEMS AND METHODS FOR COUPLING AND DECOUPLING DRILL HEADS FOR GROUND LOOP PREPARATION FOR GEOTHERMAL APPLICATIONS

CROSS-REFERENCE TO RELATED APPLICATIONS

The present application is a continuation-in-part of U.S. patent application Ser. No. 15/258,302, filed Sep. 7, 2016, the entire disclosure of which is hereby incorporated herein by reference.

BACKGROUND

Traditional placement of pipe underground relies on first drilling, boring, impact piercing, or trenching. In typical ground loop installations for geothermal systems, the pipe is then inserted in the bore or trench which is then back filled to eliminate voids. As an example, FIG. 1 depicts a cross sectional view of a typical ground loop installation. Here, hole 100 is drilled in ground material 110 (line 112 differentiating between above and below ground) to a desired depth. A loop or piping 120 having a u-shape is then placed into the hole. Only a portion of this piping being shown for ease of understanding. Of course, given the shape of the hole 100 and the piping 120, there can be significant gaps between the hole and the pipe. These gaps are then filled with grout (depicted as shaded area 130) which dries and solidifies in the hole around the piping. Because of the nature of grout, the likelihood of air pockets 140, 142 in the grout and around the piping is relatively high. These air pockets can reduce heat transfer between fluid, such as water, coolant, etc., in the pipes and the ground material thereby reducing the efficiency of the ground loop and the entire geothermal system.

Another traditional method of installing pipe underground involves pulling the pipe behind a pneumatic boring tool while creating an opening for the pipe. This process is useful for horizontal drilling, such as to place piping under a roadway, as the drill can be removed the far end of the pipe so that it can be recovered and the piping terminated. This technique is less useful for vertical drilling as the boring tool, which is fused to the pipe in order to pull it through the opening created by the boring tool, cannot be recovered by pulling it back through the pipe.

BRIEF SUMMARY

One aspect of the disclosure provides a system for drilling an opening in ground material. The system includes a first drill head configured as a pipe pulling drill head and configured to create the opening in the ground material and a second drill head configured for attachment with a boring tool. Wherein when attached to an end of the pipe, the first drill head is configured to pull the pipe into the opening in ground material. The second drill head includes a drilling portion and an opening opposite of the drilling portion. The opening includes a first chamber that tapers towards a second chamber, and the first drill head includes a drilling end configured for a locking fit within the second chamber.

In one example, the second drill head and the first drill head are configured for unlocking the locking fit. In another example, the second drill head is configured with a pair of ball locks arranged to allow the locking fit. In this example, a ball of the pair of ball locks is arranged in a corresponding opening that extends through the second drill head. In addition, the corresponding opening includes a first end and a second end opposite of the first end, and the second end has a taper such that the second end is narrower in diameter than the first end. In addition, the taper is configured to prevent the ball from passing through the second end. In addition or alternatively, the second chamber includes a first groove and a second groove, wherein the locking fit includes a first ball of the pair of ball locks in the first groove and a second ball of the pair of ball locks in the second groove. In this example, the locking fit includes an interference fit between the first ball and the first groove and an interference fit between the second ball and the second groove.

In one example, the system also includes the boring tool. In another example, the system also includes the pipe. In this example, the first drill head includes a thread-cutting interface configured to attach the first drill head to the pipe. In addition or alternatively, the system also includes a collar arranged around the pipe. In another example, the drilling end includes a tapered shape, and the opening includes a chamber configured with a tapered shape that is narrower than the tapered shape of the drilling end such that the locking fit includes a fit between the tapered shape of the drilling end and the tapered shape of the second chamber.

In another example, the second drill head is configured with a pair of latch locks arranged to allow the locking fit, each latch lock including a latch head having a width dimension that is greater than a length dimension, and the latch head having a rounded shape in the width dimension and a rounded shape in the length dimension. In this example, the system also includes a cover plate configured to secure one of the latch locks to the drill head. In this example, the cover plate includes a latch head opening that extends from a top surface of the cover plate to a bottom surface of the cover plate, and the latch head is arranged to extend through the latch head opening and away from the top surface. In addition or alternatively the system also includes a spring, the cover plate includes an internal flange and the one of the latch locks includes a shelf area, and the spring is arranged to force the shelf area towards the interior shelf. In addition or alternatively, the system also includes a screw configured to hold the cover plate to the drill head and secure the one of the latch locks to the drill head. In addition or alternatively, a radius of curvature of the rounded shape in the width dimension is greater than a radius of curvature of the rounded shape in the length dimension.

Another aspect of the disclosure provides a method of drilling an opening in ground material. The method includes inserting a boring tool into a second end of a first pipe, the first pipe having a first drill head attached at a first end of the first pipe and the boring tool having a second drill head; after inserting the boring tool, creating a locking fit between the first drill head and the second drill head; using the first drill head and the boring tool to create the opening in ground material; while creating the opening, pulling the first pipe into the opening with the drill head; disconnecting the first drill head and the second drill head by unlocking the locking fit; and removing the boring tool from the first pipe.

BRIEF DESCRIPTION OF THE DRAWINGS

FIG. 21 is an example perspective view of a second drill head in accordance with aspects of the disclosure.

FIG. 22 is an example perspective view of a boring tool in accordance with aspects of the disclosure.

FIG. 23 is an example cross-sectional detail view of a portion of the second drill head of FIG. 21 in accordance with aspects of the disclosure.

FIG. 24 is an example cross-sectional detail view of a portion of FIG. 24 in accordance with aspects of the disclosure.

DETAILED DESCRIPTION

Overview

Figure 1:
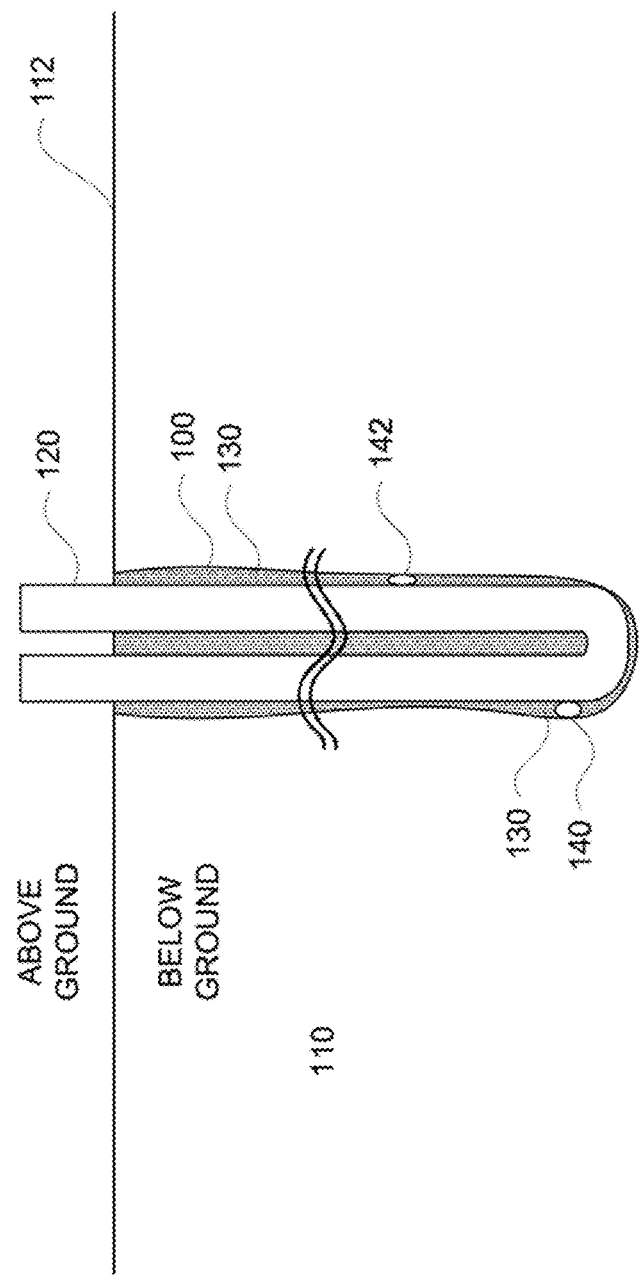
FIG. 1 is an example cross-sectional diagram of a typical ground loop system in accordance with the prior art.

Aspects of the technology relate to creating a ground loop for a geothermal heating and/or cooling system, such as those used to heat and cool various structures. To reduce energy loss and increase efficiency of a ground loop, ground loop installation systems and methods are provided.

To facilitate direct "one way" installation of pipe using a pneumatic boring tool having a second drill head made of wear resistant materials, a first drill head may be used. This first drill head may be a pipe pulling impact head made of wear resistant materials. The first drill head may be attached to the leading end of the pipe. In this regard, the first drill head remains in the ground after drilling is completed, while the boring tool is removed through the pipe.

The boring tool includes a second drill head configured to couple and decouple with the first drill head. In this regard, the boring tool can be inserted into a trailing end of the pipe, coupled to the first drill head at the leading end of the pipe during the drilling, decoupled from the first drill head once drilling is completed, and removed from the pipe at the trailing end of the pipe.

The first drill head may include a thread-cutting interface for mating with an internal portion of the leading end of the pipe in order to attach the drill head to the leading end of the pipe. A collar may also be used to support the second end of the pipe. In addition, the first drill head may include an opening that extends into the first drill head.

To facilitate the coupling between the drill heads, a locking fit such as a taper lock may be used. For instance, the second drill head may have a tapered shape configured to lock with the opening in the first drill head. The opening of the first drill head may have a first chamber having a first width that narrows toward a second chamber with a tapered shape that is slightly smaller than the tapered shape of the second drill head.

The second drill head is attached to the boring tool and inserted into the trailing end of the pipe until the taper of the second drill head meets with the opening in the first drill head. At this point, drilling can begin, and the taper of the second drill head is coupled to the tapered shape of the second chamber creating the taper lock. Because the forward impacting creates a higher downward force relative to upward during the return stroke, the taper lock remains engaged during forward impacting. When the boring tool is reversed, for instance by twisting the compressed air hose that controls the boring tool, the forces are reversed and the taper lock is knocked loose. This allows the boring tool to be pulled out of the pipe via the air hose or by an attached cable or chain for this purpose.

Alternatively, rather than a taper lock, a ball lock may be used to facilitate the coupling and decoupling. In this regard, the second drill head may include a pair of ball locks oriented opposite of one another. Each ball lock may be installed in the second drill head by drilling or machining an opening through the second drill head. Alternatively, the opening may be formed in a molding or casting process. The opening is drilled from a first end such that a taper is created at a second end of the opening.

When a ball is placed in the first end of the opening, the taper prevents the ball from passing through the second end. After the ball, a spring is inserted in the first end of the opening, and thereafter, a locking screw is threaded into the first end of the opening and towards the spring. Eventually, the spring is compressed against the ball, until a desired amount of tension is reached. The second drill head may then be attached to the boring tool.

The opening of the first drill head may have a first chamber having a first width that narrows toward a second chamber with a cylindrical shape that is complementary to the shape of the second drill head. The second chamber may include two grooves. Each groove may be sized to fit a portion of a ball.

The second drill head is attached to the boring tool and inserted into the trailing end of the pipe until the second drill head meets with the opening in the first drill head. The boring tool may then be turned on in order to force the second drill head within the first drill head. As the first drill head passes into the first chamber, the tapered edge compresses the ball. When the ball is within the second chamber and in line with the first groove, the ball moves into the first groove and decompresses, but not fully into the rest condition to allow for some tension between the ball and the groove. In this regard, the fit between the ball and the groove is an interference fit. Additional force on the second drill head causes the ball to decompress again and move further into the first drill head until eventually both balls are in corresponding grooves.

The spring force on the balls is balanced so that the return stroke does not decouple the heads but still allows the boring tool to be separated by one or more of pulling it up with the air hose or cable while engaged in the forward direction, pulling the boring tool out using attached cable with boring tool turned off, and pulling it up with the air hose or cable while engaged in the reverse direction this technique is used where the groove is configured to prevent full rotation of the second drill head within the first drill head, thereby allowing the line to be twisted to reverse the mole. However, allowing for full rotation of the second drill head may spread out wear on the grooves caused by the drilling, though the first drill head need only be used once.

Alternatively, rather than a taper or ball lock, the locking fit may include a latch lock. As with the taper and ball locks, the latch lock may facilitate coupling and decoupling of two drill heads. To utilize a latch lock, the first drill head of the ball lock example may be used with a different second drill head that includes a pair of latch locks oriented opposite of one another.

To install the latch locks in the second drill head, several chambers may be machined into the drilling portion. The components of the latch lock may then be placed within the chambers. For instance, each latch lock may include a latch piece, a spring, a cover plate and a pair of locking screws arranged at least partially within the chambers.

As with the taper lock and ball lock examples, in the latch lock example, the second drill head is attached to the boring tool and inserted into the trailing end of the pipe until the second drill head meets with the opening in the first drill head. The boring tool may then be turned on in order to force the second drill head within the first drill head.

Upon insertion into the first drill head, the latch locks may function similarly to ball locks. Thus, as with the taper lock and ball lock, the latch lock allows the first and second drill heads to remain locked together during the hammering to create the opening. And again, once the first and second drill heads are separated, the boring tool and air hose may be removed from the pipe. This allows the boring tool to be pulled out of the pipe via the air hose or by an attached cable or chain for this purpose. The ground loop installation may thereafter proceed as described in the examples above.

In order to create a loop within a pipe (without making the pipe into a u-shape as shown in FIG. 1), a multi-channel pipe may be inserted within the pipe. The multi-channel pipe may be arranged with an inner fluid channels arranged concentrically with an outer fluid channel formed by the walls of the inner fluid channel and the interior surface of the pipe. In order to insulate between these channels, one or more air channels may be arranged between the inner and outer fluid channels. To maintain a relative gap between the multi-channel pipe and the pipe, the multi-channel pipe may also include one or more ribs. The ribs, fluid channels and air channels may run the length of the pipe for ease of manufacturing.

To create the loop, the inner and outer fluid channels of the first end portion of the multi-channel pipe that is place into the ground material must be connected at the first end portion. In this regard, fluid moving through the outer channel may be connected to the inner channel at the end portion. Similarly, fluid moving through the inner channel may be connected to the outer channel at the end portion.

To close the ends of the air channel and prevent fluid from entering the air channels, a bottom cap may be attached to the multi-channel pipe. The bottom cap may be attached via socket fusion within each or the one or more of the air channels of the multi-channel pipe. To ensure an effective fusion, a cutting tool may be used to trim the walls of the multi-channel pipe before fusion. The bottom cap may also include extension portions having ends that extend towards and contact the sealant material. Gaps between the extension portions allow for fluid to flow between the extension portions even where the ends of the extension portions are in contact with the sealant. The bottom cap therefore allows fluid to flow between the inner and outer channels at the first end portion of the multi-channel pipe while at the same time preventing fluid from passing into the one or more air channels.

To connect the inner fluid channel and outer fluid channel with the rest of a geothermal heating and/or cooling system, a specialized T-fitting may be used. The combination of the pipe, first drill head, bottom cap, multi-channel pipe, and T-fitting may form a loop. The T-fitting may include two fluid ports for connecting the loop to the rest of the system. The first and second ports may allow for fluid leaving and/or entering the ground loop to leave and/or enter the inner fluid channel via interior walls. The second port allows for fluid leaving and/or entering the ground loop to leave and/or enter the outer fluid channel between the interior walls and exterior walls of the T-fitting. Once the T-fitting is in place, the first and second ports may be connected to the various other components of a geothermal heating and/or cooling system.

The features described herein may greatly simplify the process of installing the ground loop plumbing and fittings which leads to reductions in time, cost, and site disruption. Using the multi-channel pipe eliminates the need for the infusion of grout to fill voids since the pipe is in close contact with the ground material and air pockets are much less likely. Accordingly, these features may result in a more widespread use of geothermal heating and cooling technology.

EXAMPLE SYSTEMS

Figure 2:
FIG. 2 is an example of a pipe with an attached first drill head in accordance with aspects of the disclosure.
Figure 4:
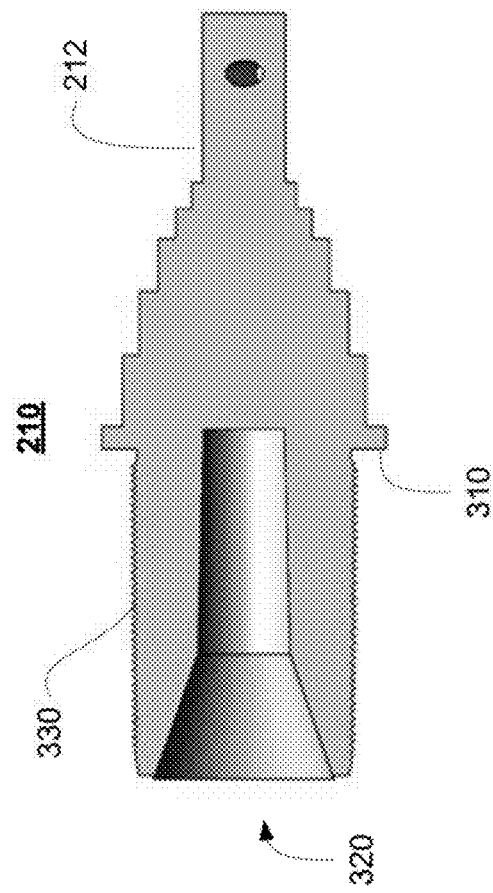
FIG. 4 is an example cross-sectional diagram of the first drill head of FIG. 3 in accordance with aspects of the disclosure.

To reduce energy loss and increase efficiency of a ground loop for geothermal heating and cooling applications, a ground loop installation system is provided. Referring to FIG. 2, the system may include a pipe 200 (shown coiled) with a first drill head 210 attached at a first end 220 of the pipe. The pipe may be comprised of various materials, including, for instance high-density polyethylene (HDPE), suitable for use in ground loop applications. The diameter of the pipe may be selected based upon the amount of fluid that will be moving through the ground loop. In one instance, the diameter of the pipe may be 75.7 mm (2.5 inches) or more or less. The thickness of the walls of the pipe may be on the order of 2 mm or more or less to allow heat loss or gain with the ground material through the walls during operation of the ground loop. The length of pipe required may be at least half the length of the ground loop desired. In other words, the length of the pipe 200 may correspond to the depth of a hole to be drilled with some additional length required to attach to other components of a heating and/or cooling system at or near a second end 222 of the pipe.

The shape of a drilling portion 212 of the first drill head 210 may be selected with attributes suitable for creating a hole in the particular ground material that is being drilled. For instance, different shapes may be required for material such as sand, clay and rock. However, the first drill head may include at least a drilling portion that can create an opening or hole in the ground material using a hammering force.

Figure 3:
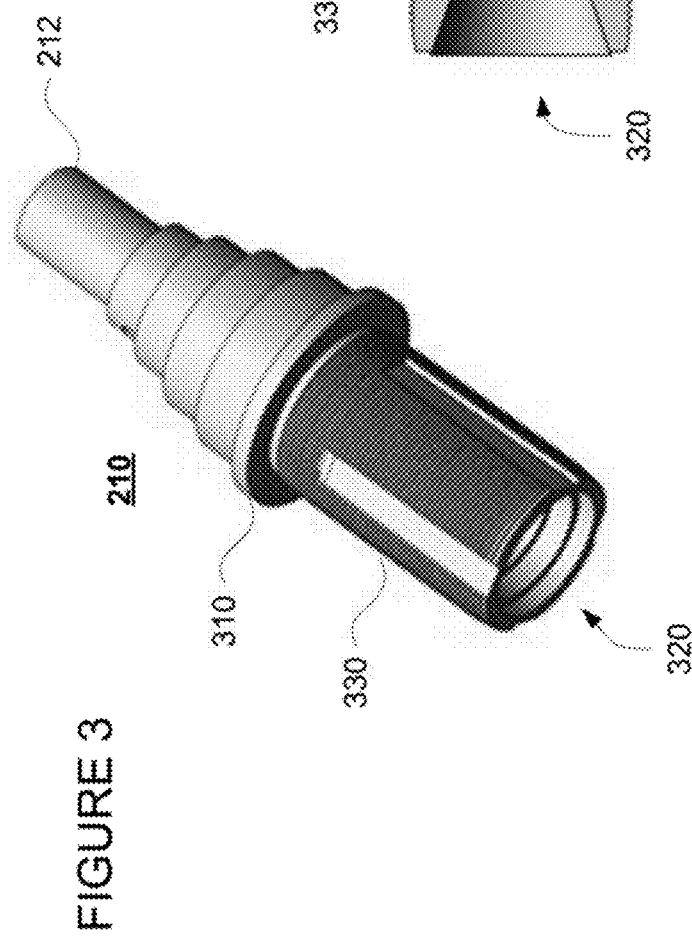
FIG. 3 is an example perspective view of the first drill head of FIG. 2 in accordance with aspects of the disclosure.

FIG. 3 is an example perspective view of first drill head 210 prior to attachment with the pipe 200. As shown, the first drill head may include a ridge section 310 around the drilling portion that overhangs the outer diameter of the pipe for at least some minimum distance, such as 1.35 mm or more or less, in order to reduce or prevent damage to the pipe during drilling. In addition, the first drill head may include an opening 320 sized to receive a second drill head of a boring tool discussed in further detail below.

The first drill head also may include a thread-cutting interface 330 (shown in FIG. 3) for mating with an internal portion of the pipe in order to attach the first drill head to the pipe as is depicted in FIG. 2. As shown in FIG. 3, the thread-cutting interface at least partially surrounds an opening in the first drill head opposite of the drilling portion. Thus, threading may be cut into an internal surface 610 of the pipe 200 (shown in FIG. 6) by rotating the first drill head so that the thread-cutting interface cuts into the internal portion of the pipe. This cutting may create a threaded interface between the cut threading of the pipe and the thread-cutting interface of the first drill head. The threaded interface is thus a frictional seal between the pipe 200 and first drill head 210 which may prevent the first drill head from separating from the pipe during drilling.

Figure 5:
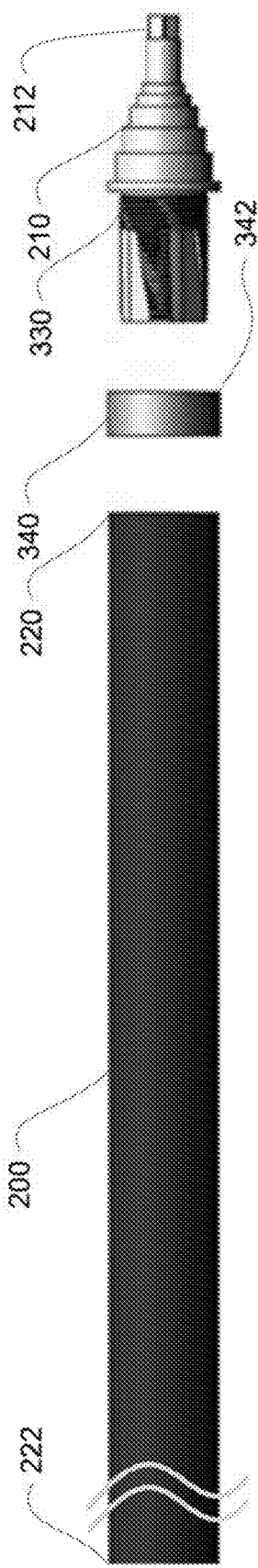
FIG. 5 is an example perspective view of the pipe and first drill head in accordance with aspects of the disclosure.

To support the pipe in the area of the first drill head, prior to rotating the first drill head into the pipe, a collar may be placed around the pipe. For example, as shown in FIG. 5, collar 340 may be placed around the first end 220 of the pipe prior to attaching the first drill head 210 to the pipe. A first end 342 of the collar may also include an inner flange (not shown) that may keep the collar 340 in position at the first end of the pipe or in other words, keep the collar from moving too far towards the second end 222 of the pipe. The collar may help to prevent the pipe from flaring due to the cutting force of the thread-cutting interface 330, resulting in a more effective cut threading formed on the internal portion of the pipe.

In some examples, prior to attaching the first drill head to the pipe, a sealant material may be applied to the thread-cutting interface and/or the internal portion of the pipe (to be threaded). This sealant material may include, for instance, a multi-part resin, epoxy, silicone or other such material. The second removable tube may be arranged to provide the sealant pneumatically through a nozzle at the end of the second tube which, for instance, can be lowered towards the first drill head using an air hose. The sealant material may create a fluid tight seal between the pipe and the first drill head so that fluid within the pipe does not leak into the ground through the thread-cutting interface of the first drill head and cut threading of the pipe.

Figure 7:
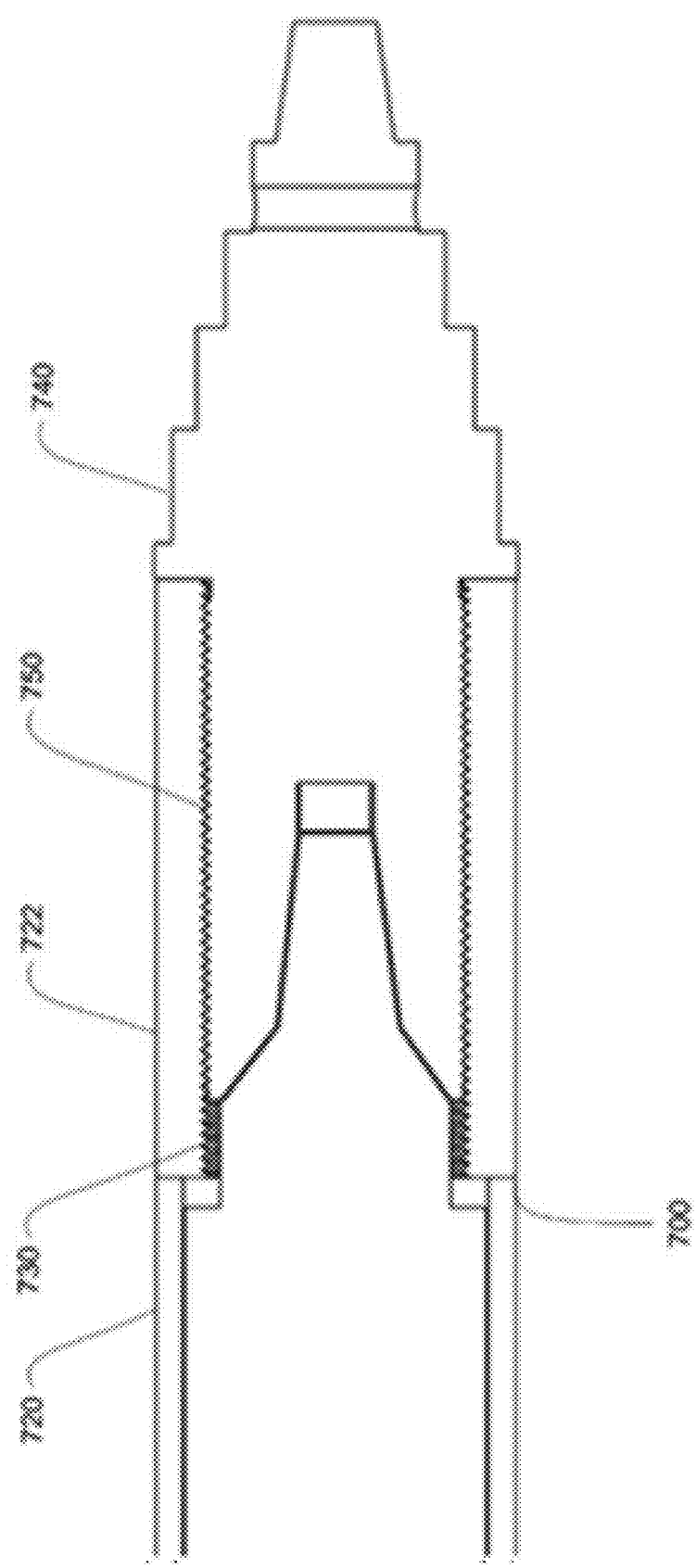
FIG. 7 is an example cross-sectional diagram of a pipe an attached first drill heat in accordance with aspects of the disclosure.

In one example alternative, depicted in FIG. 7, an end of a pipe 700 (comparable to pipe 200) may actually include portions 720, 722. For instance, each portion may have the same outer diameter (e.g. 75.7 mm or more or less), but a longer portion 720 having a thinner outer wall (e.g. 2 mm or more or less) may be attached to a shorter portion 722 having a thicker outer wall (e.g. greater than 2 mm or more or less). In this example, the pipe 700 may include an internal threaded portion 730 within the shorter portion, thus, a first drill head 740 (comparable to first drill head 210) may include a threading interface 750 (rather than a thread-cutting interface 330 as with first drill head 210). Alternatively, as in the example described above, the internal threading may be cut by the thread-cutting interface of the first drill head, and in this example, a collar, similar to collar 340 may or may not be used to support the shorter portion 722.

Figure 8:
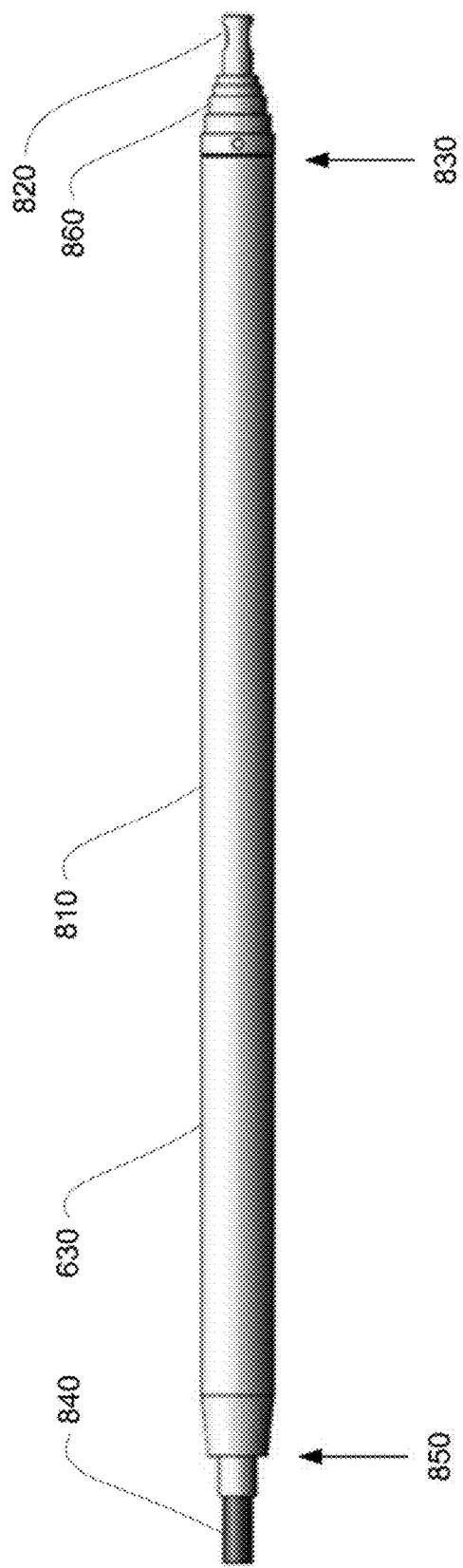
FIG. 8 is an example perspective view of a boring tool in accordance with aspects of the disclosure.
Figure 9:
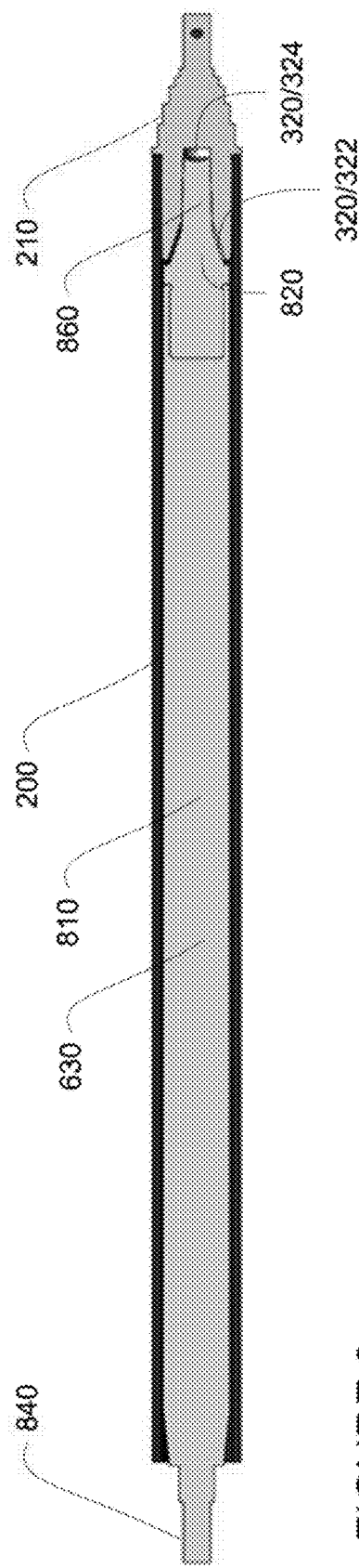
FIG. 9 is an example cross sectional view of the pipe and attached first drill head of FIG. 2 with the boring tool of FIG. 8 inserted therein.

Returning to FIG. 6, the pipe 200 may be configured with a hollow interior 620. The hollow interior may be sized to allow a boring tool 630, such as commercially available pneumatic boring tools offered by Grundomat®, to be placed within the pipe 200. FIG. 8 is a perspective view of the boring tool 630, and FIG. 9 is a cross sectional view of the pipe 200 with the boring tool inserted therein. The boring tool may be configured as a tube 810 with a second drill head 860 (for instance, a pneumatic hammer) at a first end 830 of the tube and an air hose 840 (also shown in FIG. 2) attached to a second end 850 of the tube. The air hose 840 can be connected to an air compressor (not shown) outside of the pipe 200 in order to control the second drill head 860. The second drill head 860 may be a removable drill head that attaches and detaches from the boring tool 630 via threading (not shown).

Figure 6:
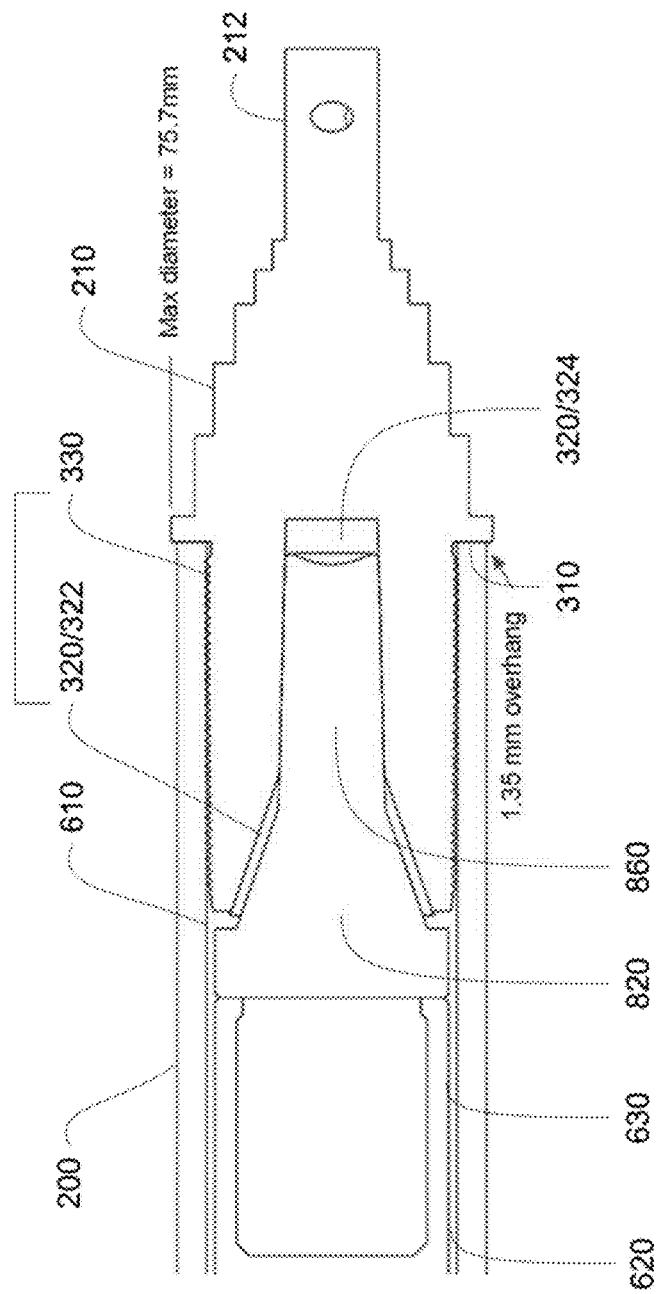
FIG. 6 is an example cross-sectional diagram of the pipe and attached first drill head of FIG. 2 in accordance with aspects of the disclosure.

A drilling portion 820 of the second drill head 860 may be positioned within the tube in order to mate with the opening 320 in the first drill head 210 (as shown in FIGS. 6 and 9). By doing so, the drilling portion 820 of the second drill head 860 can contact an interior of the first drill head proximate to the drilling portion 212 and force the drilling portion into the ground material via a locking fit between the second drill head 860 and the opening 320. This can cause the first drill head 210 to create an opening in the ground material. At the same time, the threaded interface between the pipe and the first drill head causes the moving first drill head to pull the pipe into and through that opening.

As noted above, to facilitate the locking fit between the first and second drill heads, a taper lock may be used. For instance, the second drill head 860 may have a tapered shape configured to lock with the opening 320 in the first drill head 210. As an example, the tapered shape may include a taper angle of between 3 and 6 degrees or more or less. Referring to FIG. 6, opening 320 head may have a first chamber 322 having a first width that narrows toward a second chamber 324 with a tapered shape that is slightly smaller than the tapered shape of the drilling portion 820 of the second drill head 860. The tapered shape of the first chamber 322 may help to guide the drilling portion 820 into the second chamber 324. In this regard, the difference between the taper angles forms a taper lock when the second drill head 860 is inserted into the second chamber 324.

Figure 11:
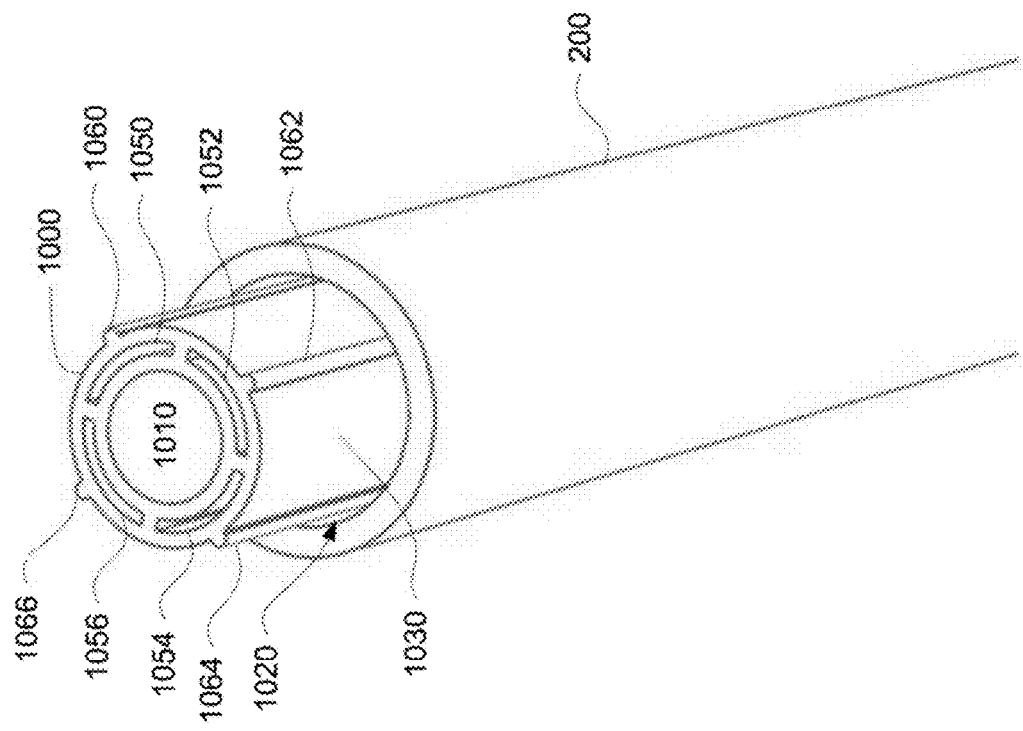
FIG. 11 is an example perspective view of the pipe and a multi-channel pipe of FIG. 10.
Figure 10:
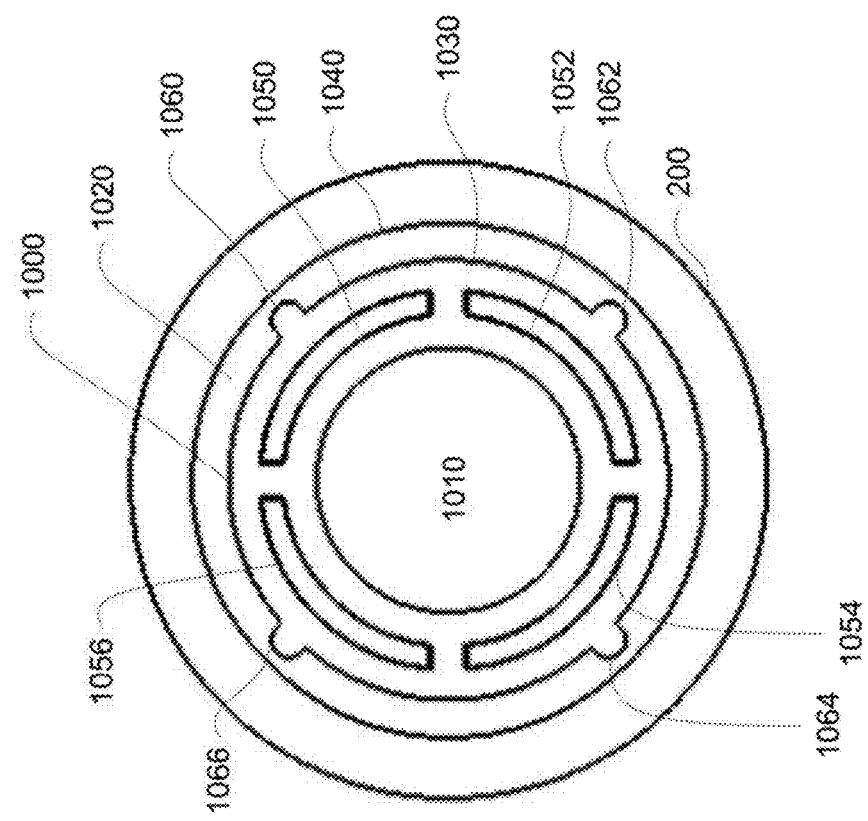
FIG. 10 is an example cross sectional view of the pipe and a multi-channel pipe in accordance with aspects of the disclosure.

In order to create a loop within a pipe (without making the pipe into a u-shape as shown in FIG. 1), a multi-channel pipe may be inserted within the pipe. FIG. 10 is a cross sectional view of the pipe 200 and a multi-channel pipe 1000, and FIG. 11 is a perspective view of the pipe 200 and a multi-channel pipe 1000. The multi-channel pipe may be arranged with an inner fluid channel 1010 arranged concentrically with an outer fluid channel 1020 formed by the outer surface of wall 1030 of the multi-channel pipe and the interior surface 1040 of the pipe 200. In order to insulate between these channels, one or more air channels, here shown as 4 air channels 1050, 1052, 1054, 1056 may be arranged between the inner and outer fluid channels. To maintain a relative gap between the multi-channel pipe and the pipe, the multi-channel pipe may also include one or more ribs, here shown as 4 ribs 1060, 1062, 1064, 1066 arranged on the outer surface of the wall 1030. The ribs, fluid channels and air channels may run the length of the pipe for ease of manufacturing.

To create a loop, the inner and outer fluid channels of the first end portion of the multi-channel pipe that is place into the ground must be connected at the first end portion. In this regard, fluid, such as water or water combined with antifreeze, alcohol, or other liquids moving through the outer channel may be connected to the inner channel at the end portion (the reverse would also be true). To do this, there must be a fluid tight seal between the pipe and the first drill head.

In addition to or as an alternative to applying the sealant material on the first drill head and/or pipe before attaching the first drill head to the pipe to create a fluid tight seal between the pipe and the first drill head, before inserting the first end portion 1150 and the multi-channel pipe into the pipe, a sealant material may be deposited, for instance using a second removable tube to provide the material, at the end of the pipe just above the first drill head. For instance, as shown in the cross-sectional view of FIG. 12, sealant material 1100 is placed within the opening 320 in the first drill head 210. This sealant material may include, for instance, a multi-part resin, epoxy, silicone or other such material. The second removable tube may be arranged to provide the sealant pneumatically through a nozzle at the end of the second tube which, for instance, can be lowered towards the first drill head using an air hose. The sealant material 1100 creates a fluid tight seal between the pipe and the first drill head so that fluid within the pipe does not leak into the ground through the thread-cutting interface of the first drill head and cut threading of the pipe.

Figure 13:
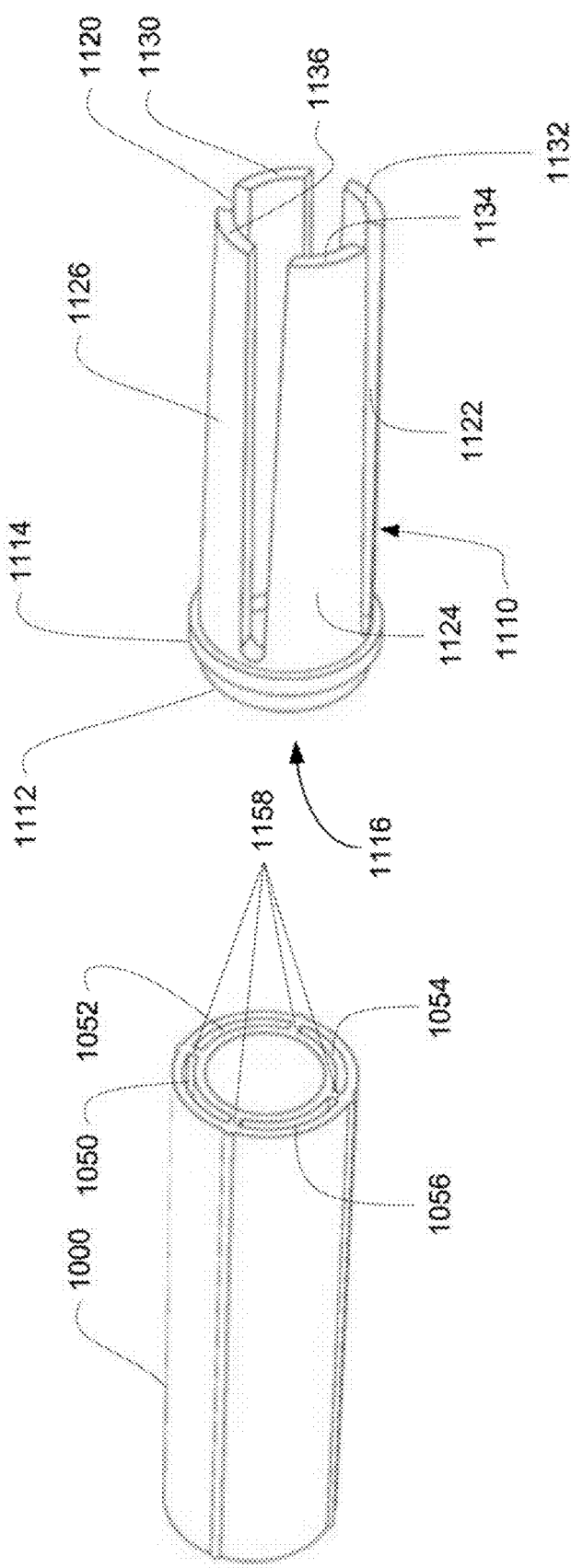
FIG. 13 is an example view of a bottom cap and a multi-channel pipe in accordance with aspects of the disclosure.
Figure 14:
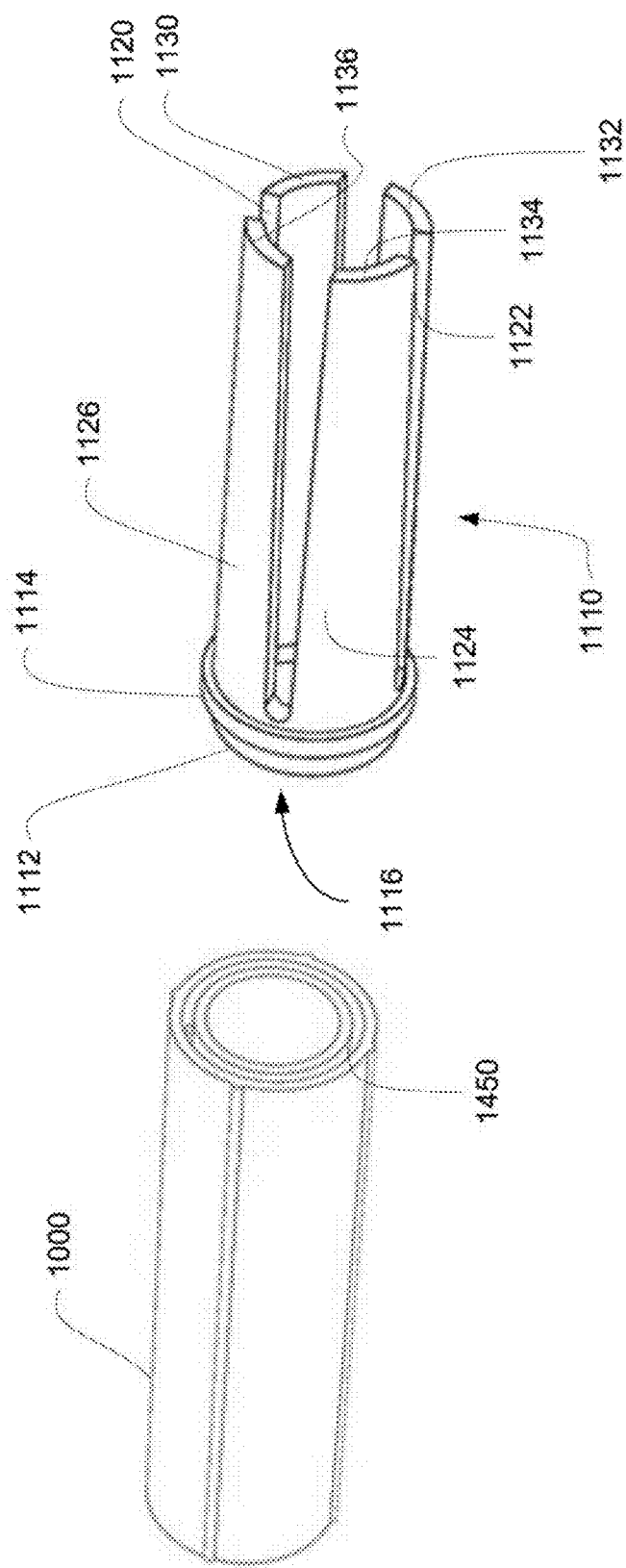
FIG. 14 is another example view of a bottom cap and a multi-channel pipe T-fitting in accordance with aspects of the disclosure.

To close the ends of the air channel and prevent fluid from entering the air channels, a bottom cap may be attached to a first end of the multi-channel pipe. For instance, a first end 1112 of a bottom cap 1110 (shown in detail in the breakout view of FIGS. 13 and 14) may be attached to the multi-channel pipe 1000 via socket fusion within each or the one or more of the air channels 1050, 1052, 1054, 1056 of the multi-channel pipe. To ensure an effective fusion, a cutting tool may be used to trim the walls 1158 (shown in FIG. 13) between the one or more air channels thereby creating an even, smooth ring opening 1450 (shown in FIG. 14) for connection with a surface of ridge 1114, before fusion. Ridge 1114 and first end 1112 may be configured create a fluid tight seal with the one or more air channels thereby preventing fluid from entering the air channels. The ridge 1114 and the first end 1112 surround an opening 1116 (see FIG. 12) that allows fluid to pass from the inner fluid channel 1010 and into the bottom cap 1110.

Figure 12:
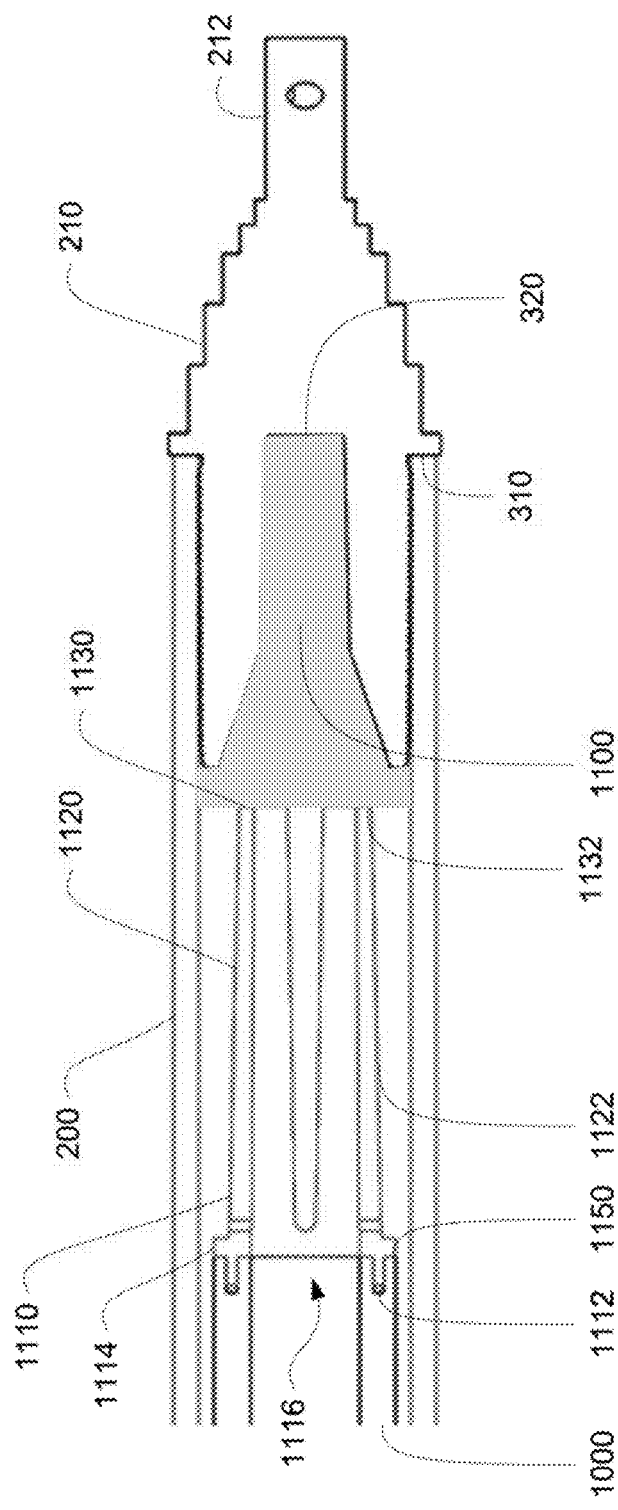
FIG. 12 is an example cross sectional view of the pipe and multi-channel pipe of FIG. 10 with a bottom cap and sealant material in accordance with aspects of the disclosure.

The bottom cap 1110 may also include extension portions 1120, 1122, 1124, 1126 having ends 1130, 1132, 1134, 1136 that extend towards and contact the sealant material. Gaps between the extension portions 1120, 1122, 1124, 1126 allow for fluid to flow between the extension portions, even where the ends of the extension portions are in contact with the sealant material 1100 (as shown in FIG. 12) or first drill head (not shown, but where sealant material is placed on the first drill head and/or pipe prior to attaching the first drill head to the pipe). The bottom cap 1110 therefore allows fluid to flow between the inner and outer channels at the first end portion 1150 of the multi-channel pipe while at the same time preventing fluid from passing into the one or more air channels 1050, 1052, 1054, 1056.

Figure 15:
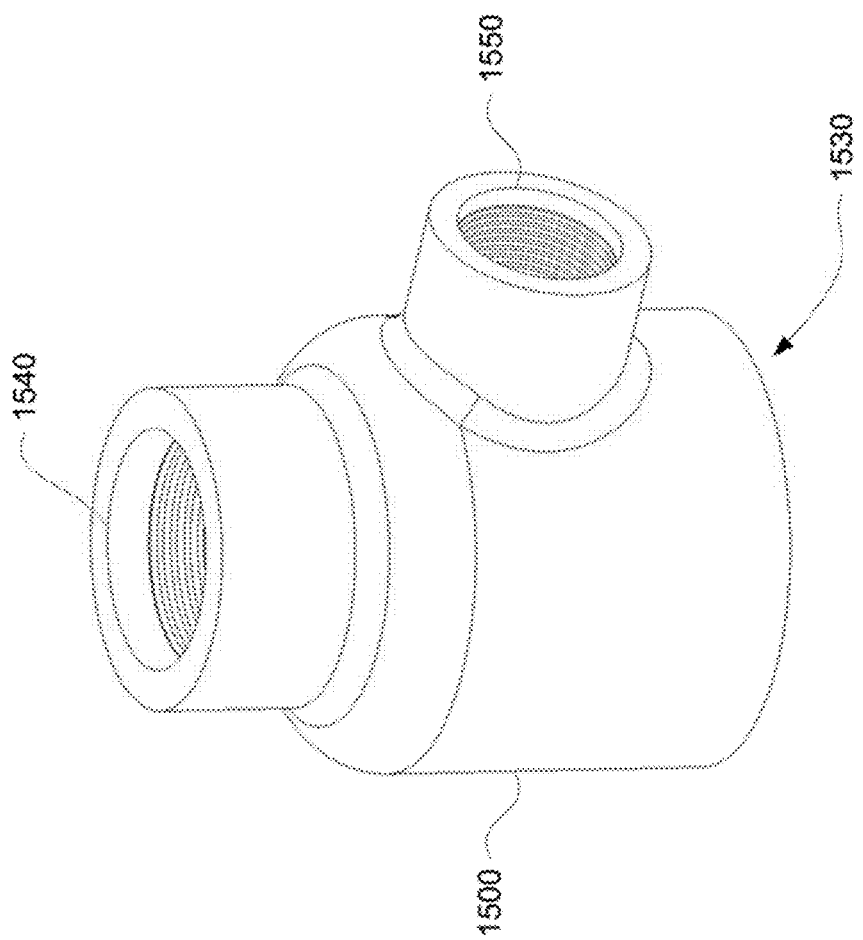
FIG. 15 is an example side perspective view of a T-fitting in accordance with aspects of the disclosure.
Figure 16:
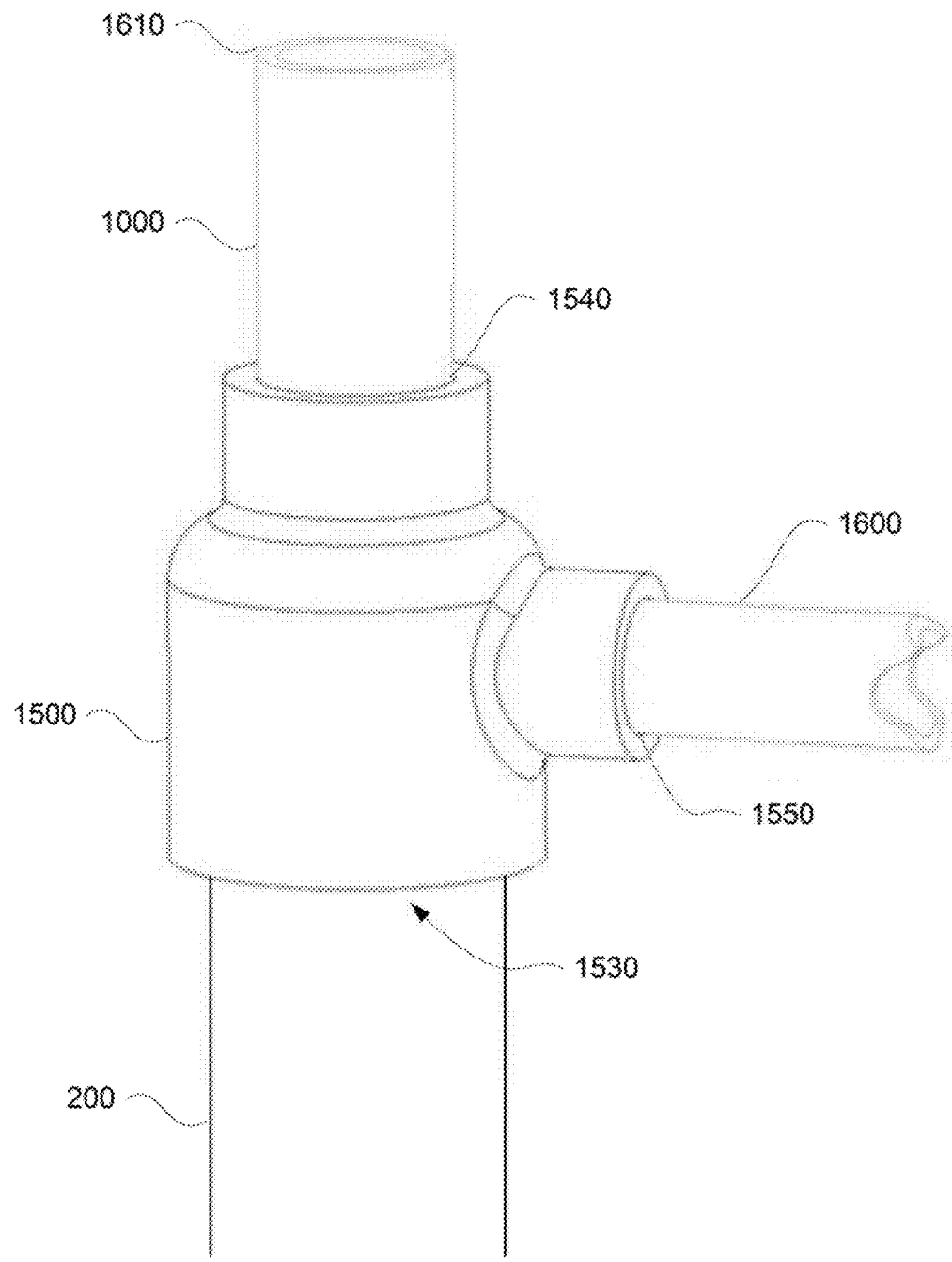
FIG. 16 is a side perspective view of the T-fitting of FIG. 15 with a multi-channel pipe, pipe, and a connection pipe in accordance with aspects of the disclosure.
Figure 17:
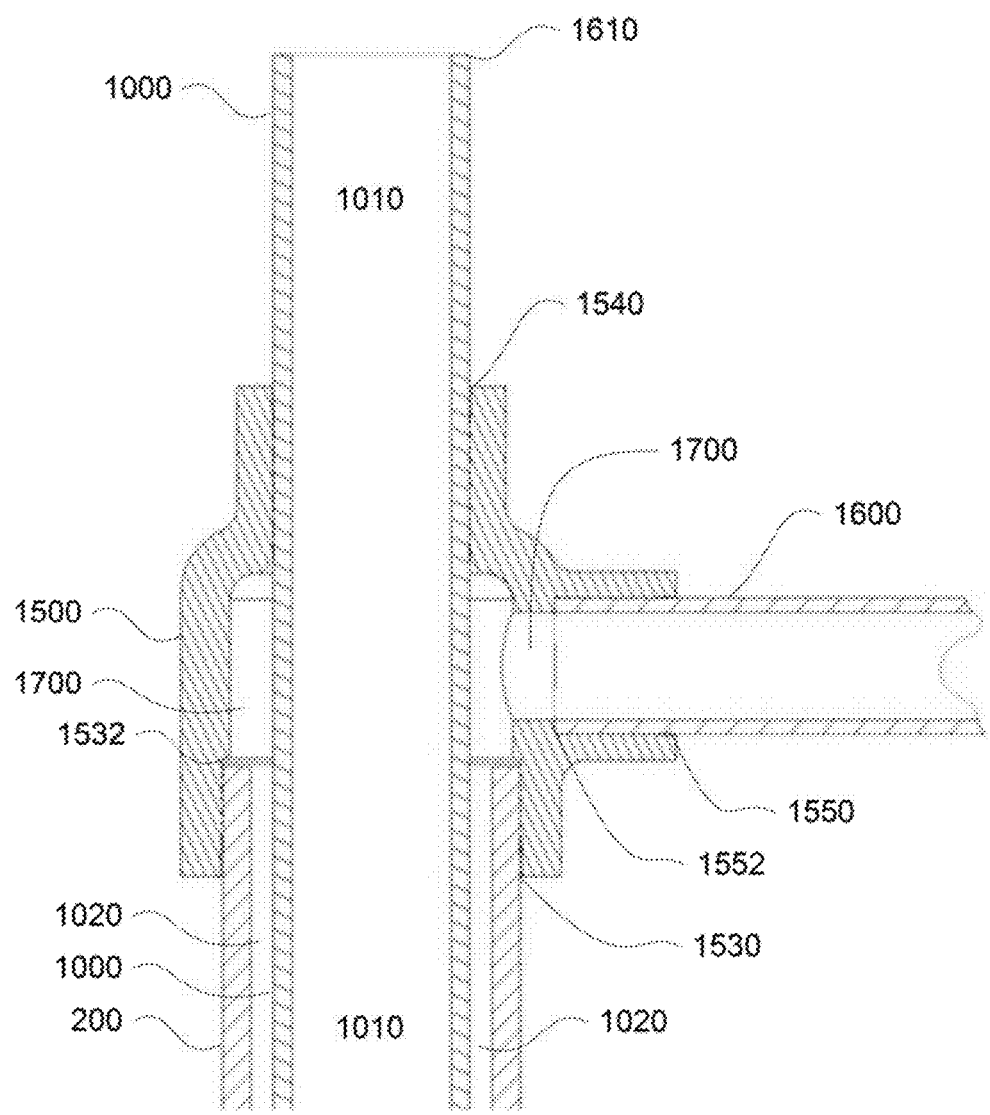
FIG. 17 is an example cross sectional view is a cross sectional view of the the T-fitting of FIG. 15 with the multi-channel pipe, pipe and connection pipe of FIG. 16 in accordance with aspects of the disclosure.

To connect the inner fluid channel and outer fluid channel with the rest of a geothermal heating and/or cooling system, a specialized T-fitting may be used. The combination of the pipe, first drill head, bottom cap, multi-channel pipe, and T-fitting may form a loop. For example, FIG. 15 includes a T-fitting 1500, FIG. 16 is a view of the T-fitting 1500, pipe 200, multi-channel pipe 1000, and a connection pipe 1600, and FIG. 17 is a cross sectional view of the T-fitting, pipe, multi-channel pipe, and the connection pipe. The T-fitting includes three ports: first port 1530 configured for connection with the pipe 200, second port 1540 configured for connection with the multi-channel pipe 1000, and third port 1550 for connecting the loop to the rest of a heating and/or cooling system.

Each of the first port 1530, second port 1540, and third port 1550 are connected to an interior chamber 1700 (shown in FIG. 17) of the T-fitting 1500. The first port 1530 is sized to fit the pipe therein. A ridge 1532 limits the movement of the pipe 200 within T-fitting. The second port 1540 is sized to fit the multi-channel pipe 1000 therein. As can be seen from FIGS. 16 and 17 when the T-fitting 1500 is attached to the pipe and multi-channel pipe, the multi-channel pipe 1000 extends out of the pipe 200, through the interior chamber 1700 in the T-fitting, and through the second port 1540. In this configuration, the exposed second end portion 1610 (opposite of the first end portion 1150) of the multi-channel pipe can be attached to the heating and/or cooling system. In addition, the one or more air openings can be sealed outside of the T-fitting, providing a simple design with a high degree of reliability and options for connection with the heating and/or cooling system. Third port 1550 is sized for connection with a connection pipe 1600. A ridge 1552 limits the movement of the connection pipe 1600 within T-fitting. The connection pipe is one example of how the T-fitting can be connected to the rest of the heating and/or cooling system.

The T-fitting can allow fluid from a heating and/or cooling system to pass into and out of the loop. Referring to FIG. 17, the T-fitting 1500 allows fluid flowing from the connection pipe 1600, to enter into the interior chamber 1700, and pass into the outer fluid channel 1020. A reverse flow of fluid, from the outer fluid channel 1020, into the interior chamber 1700, and into the connection pipe 1600 is also possible. The arrangement of the first port 1530 and second port 1540 allows for fluid from the heating and/or cooling system to enter directly into the inner fluid channel 1010 and to move through the T-fitting 1500 and pipe 200 completely within the inner fluid channel.

The T-fitting 1500 may be attached to each of the multi-channel pipe 1000 and the pipe 200 using electro fusion built into the T-fitting. In this regard, the T-fitting 1500 may include heating elements incorporated into the T-fitting and a standard electrical connection or power socket (not shown). When the socket is connected to a power source, the heating elements in the T-fitting 1500 heat the T-fitting causing the T-fitting to fuse with the pipe 200 and multi-channel pipe 1000 permanently. In addition, this type of fusion creates a fluid tight seal between the first port 1530 and the pipe 200 and a fluid tight seal between the second port 1540 and the multi-channel pipe 1000. In other words, the seals prevent fluid from passing between the first port 1530 and the pipe 200 as well as between the second port 1540 and the multi-channel pipe 1000.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to create a loop in ground material for geothermal heating and cooling applications as noted above, a first drill head may be connected to a pipe. For example, a first drill head 210 may be attached to the first end 220 of the pipe 200. The thread-cutting interface 330 may cut into the internal surface 610 of the pipe by rotating the first drill head. Once the first drill head 210 is fully inserted into the pipe 200, the ridge section 310 may contact the pipe as shown, for instance in FIGS. 2, 6, and 9. Alternatively, first drill head 740 may be inserted into pipe 700 thereby mating the threading interface 750 with the internal threaded portion 730 and securing the first drill head 740 to the pipe 700 as shown in FIG. 7. Thus, in the examples, below, pipe 200 and first drill head 210 may be replaced with pipe 700 and first drill head 740.

Next, the boring tool may be inserted into the pipe. For instance, boring tool 630 with air hose 840 may be inserted into the second end 222 of the pipe 200 and moved towards the first end 220 until the boring tool reaches the first drill head as shown in FIG. 9. At this point, the second drill head 860 can move through the first chamber 322 and into the second chamber 324 thereby forming the taper lock.

Because the forward impacting or hammering creates a higher downward force relative to upward during the return stroke, the taper lock remains engaged during forward impacting. Thus, the first drill head, second drill head, and pipe may then be used to create an opening in the ground material. For instance, the drilling portion 212 may be placed at or close to 90 degrees against the surface of the ground material at the desired location for a loop. An air compressor (not shown) can be used to control the boring tool 630 to move the second drill head 860 within the pipe. The second drill head 860 may then create a hammering force on the interior of the first drill head proximate to the drilling portion 212. This hammering force causing the drilling portion to pound into the ground material, creating an opening in the ground material. Additional hammering may cause the drilling portion 212 to enter into the opening, pulling the first end 220 of the pipe along with the first drill head (because of the connection between these features).

The hammering can continue until a desired depth of the opening is reached. The first and second drill heads may then be released from one another. As an example, the boring tool may be reversed, for instance by twisting the compressed air hose that controls the boring tool, the forces are reversed and the taper lock is knocked loose. This allows the boring tool to be pulled out of the pipe via the air hose or by an attached cable or chain for this purpose. As an example, the chain or cable may be made of steel to ensure strength and stability. At this point, the boring tool and air hose may be removed from the pipe.

The pipe may then be sealed. As noted above, a tube may be inserted into the second end 222 of the pipe 200 and moved towards the first drill head 210. The pipe may then be used to pneumatically deposit a sealant material 1100 within the opening 320. This may create a fluid tight seal between the pipe 200 and the first drill head 210. Once an appropriate amount of sealant material is deposited, the tube may be removed from the second end 222 of the pipe 200. Thereafter, the sealant material may be given an appropriate amount of time to cure, dry, solidify, etc.

Prior to inserting the multi-channel pipe into the pipe, a bottom cap may be attached to the multi-channel pipe. First, the multi-channel pipe may be prepared for fusion by trimming the walls 1158 (shown in FIG. 13) between the one or more air channels 1050, 1052, 1054, 1056 to create a smooth ring opening 1450 (shown in FIG. 14) within the multi-channel pipe for contact with the ridge 1114. Once completed, the bottom cap 1110 may be attached to the multi-channel pipe via socket fusion to create a fluid tight seal between the bottom cap and the one or more air channels 1050, 1052, 1054, 1056.

The multi-channel pipe and attached bottom cap may then be inserted into the pipe. The bottom cap 1110 and attached multi-channel may be inserted into the second end 222 of the pipe 200, and moved towards the first end 220 of the pipe. Eventually, the extension portions 1120, 1122, 1124, 1126 may contact the sealant material 1100 (as shown in FIG. 12) or first drill head (where sealant material is placed on the first drill head and/or pipe prior to attaching the first drill head to the pipe).

A T-fitting may then be attached to the pipe and multi-channel pipe. For instance, FIG. 15 depicts an example of a specialized T-fitting, shown as T-fitting 1500. T-fitting 1500 may be attached to the pipe 200 and multi-channel pipe 1000 (in the configuration shown in FIGS. 16 and 17) using electro fusion as discussed above. In this regard, a power source may be connected to the socket of the T-fitting 1500. The heating elements in the T-fitting 1500 may then heat the T-fitting and cause the T-fitting to fuse with the pipe 200 and multi-channel pipe 1000 permanently. The second end portion 1610 of the multi-channel pipe 1000 and the third port 1550 may be used to connect the loop with other components of a heating and/or cooling system, for instance via connection pipe 1600.

Figure 18:
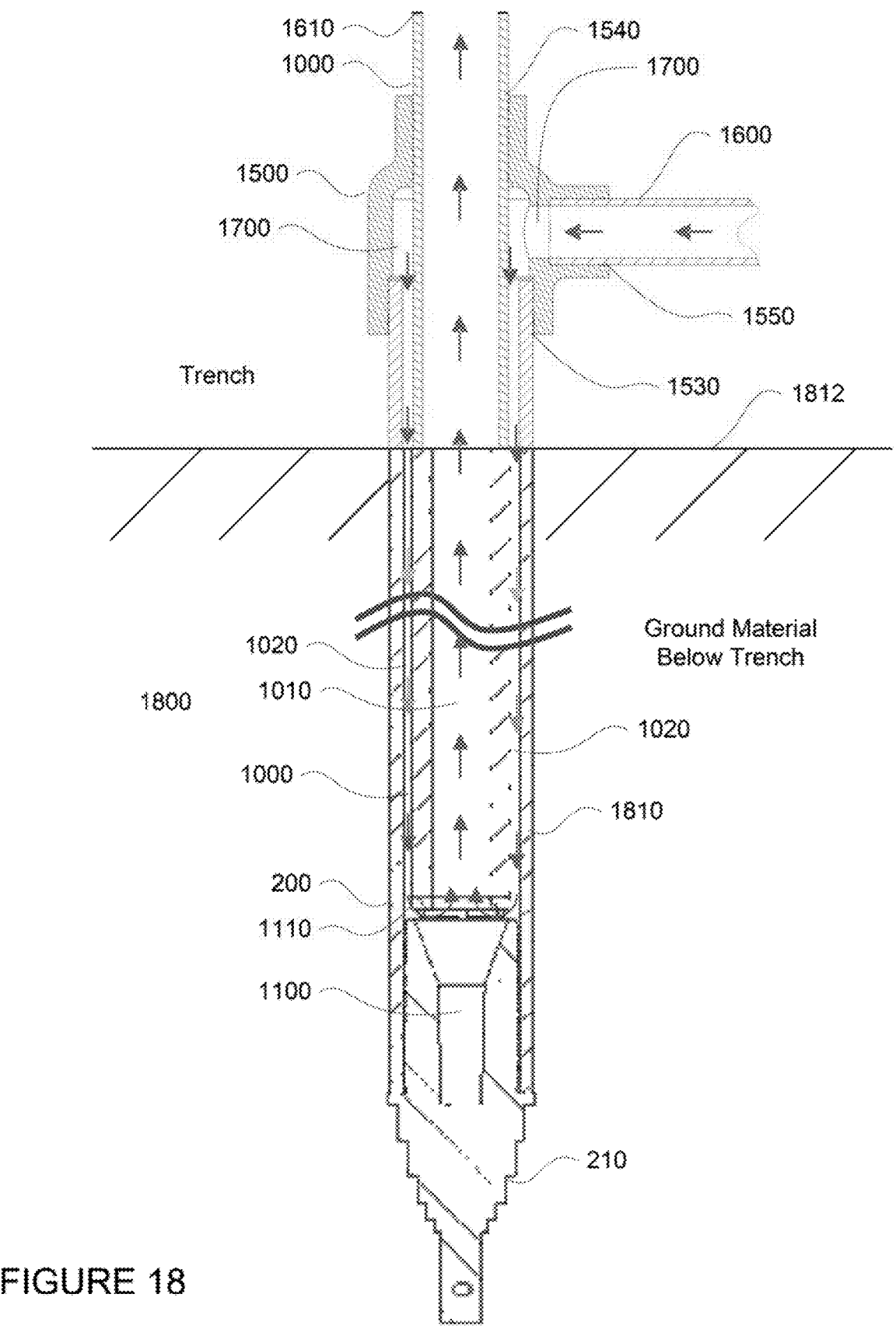
FIG. 18 is an example cross-sectional diagram of a ground loop system in accordance with aspects of the disclosure.

Turning to FIG. 18, a completed loop is shown in ground material 1800. Line 1812 defines the bottom of a trench dug below the freeze line for a ground loop. In this regard, the T-fitting 1500 is located below the freeze line, and above the opening created by the first drill head 210. As can be seen, because the pipe 200 was used to create the opening 1810, the pipe 200 fills the space of the opening, dramatically reducing the likelihood of air pockets (as in the example of FIG. 1).

Referring to the arrows of FIG. 18, during operation of a cooling system, fluid that has been heated by the other components of the system may enter the loop by passing from the connection pipe 1600 through the third port 1550, entering into the interior chamber 1700. The heated fluid may then flow from the interior chamber 1700 and down into the outer fluid channel 1020 towards the first drill head 210 losing heat through the pipe 200 into the ground material 1800 which is cooler than the fluid at this point, creating a thermal sink. Once the fluid reaches the first end portion 1150 of the multi-channel pipe 1000, the fluid may pass through the opening 1116 in the bottom cap 1110. The fluid then moves through the gaps between the extension portions 1120, 1122, 1124, 1126. At this point, the fluid enters the inner fluid channel 1010. The sealant material (at the threaded interface and/or sealant material 1100) may prevent the fluid from escaping the pipe 200 at the first drill head 210.

One or more pumps (not shown) attached at or proximate to the second end portion or connection pipe 1600 may force the fluid (at this point, cooled fluid) to move up the inner fluid channel 1010. While moving up through the inner fluid channel 1010, the cooled fluid may be insulated from heated fluid moving down the outer fluid channel 1020 by the one or more air channels 1050, 1052, 1054, 1056 between the inner and outer fluid channels. While within the inner fluid channel 1010 of the multi-channel pipe 1000, the cooled fluid eventually reaches the T-fitting 1500, passing through the first port 1530, the interior chamber 1700, and reaching the second end portion 1610 where the fluid may leave the loop and re-enter the rest of the system. Of course, the system may also be configured such that the heated fluid enters the loop through the second end portion 1610 and exits via the third port 1550.

During operation of a heating system (in other words, reversing the arrows of FIG. 18), fluid that has been cooled by the other components of the system may enter the loop by passing from the connection pipe 1600 through the third port 1550, entering into the interior chamber 1700. The heated fluid may then flow from the interior chamber 1700 and down into the outer fluid channel 1020 towards the first drill head 210 gaining heat through the pipe 200 into the ground material 1800 which is warmer than the fluid at this point, creating a thermal source. Once the fluid reaches the first end portion 1150 of the multi-channel pipe 1000, the fluid may pass through the opening 1116 in the bottom cap 1110. The fluid then moves through the gaps between the extension portions 1120, 1122, 1124, 1126. At this point, the fluid enters the inner fluid channel 1010. The sealant material (at the threaded interface and/or sealant material 1100) may prevent the fluid from escaping the pipe 200 at the first drill head 210.

One or more pumps (not shown) attached at or proximate to the second end portion or connection pipe 1600 may force the fluid (at this point, warmed or heated fluid) to move up the inner fluid channel 1010. While within the inner fluid channel 1010 of the multi-channel pipe 1000, the heated fluid eventually reaches the T-fitting 1500, passing through the first port 1530, the interior chamber 1700, and reaching the second end portion 1610 where the fluid may leave the loop and re-enter the rest of the system. Of course, the system may also be configured such that the cooled fluid enters the loop through the second end portion 1610 and exits via the third port 1550.

Figure 19:
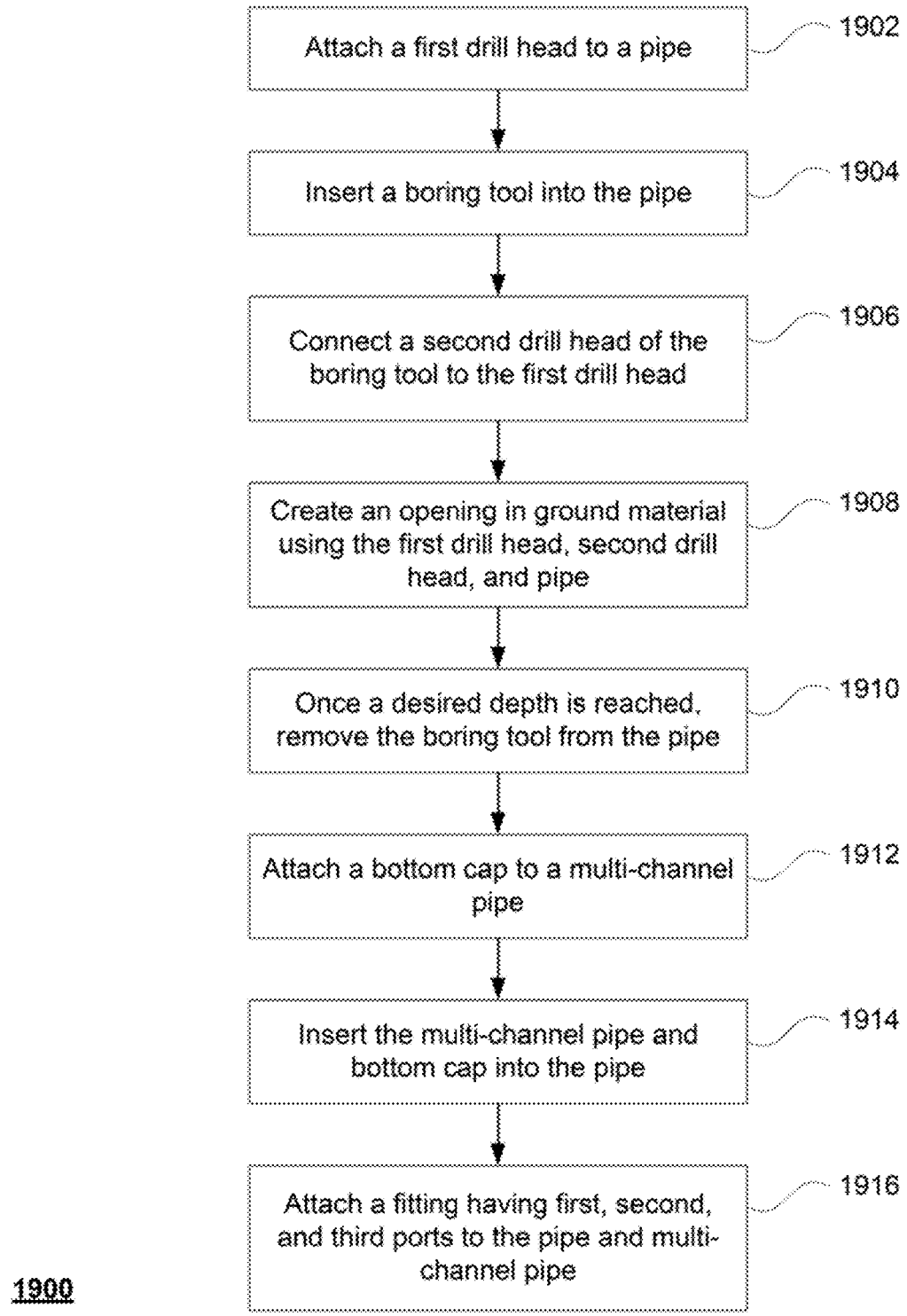
FIG. 19 is an example flow diagram in accordance with aspects of the disclosure.

FIG. 19 is a flow diagram 1900 depicting some of the aspects described above. In this example, a first drill head is attached to a pipe at block 1902. For instance, first drill head 210 may be attached to the first end 220 of the pipe 200 with or without sealant material as discussed above. Next, a boring tool may be inserted into the pipe 1904. For instance, boring tool 630 with air hose 840 may be inserted into the second end 222 of the pipe 200 and moved towards the first end 220 until the boring tool reaches the first drill head.

A second drill head of the boring tool is connected to the first drill head at block 1906. For instance, the second drill head 860 may be inserted into the opening 320 of the first drill head. The tapered shape of the drilling portion 820 of the second drill head 860, when inserted through the first chamber 322 and into the second chamber 324, causes a taper lock between the first drill head and the second drill head.

The boring tool, pipe and first drill head are used to create an opening in the ground material at block 1908. As discussed above, an air compressor (not shown) may be used to cause the second drill head 860 of the boring tool 630 to create a hammering force on the interior of the first drill head proximate to the drilling portion 212, thereby creating an opening in the ground material. Once a desired depth is reached, the first and second drill heads may be disconnected from one another, and the boring tool may be removed from the pipe at block 1910. As noted above, in some examples, the pipe may also be sealed by depositing sealant material at the first drill head.

At block 1912, a bottom cap is attached to a multi-channel pipe. For instance, the bottom cap 1110 may be attached to the multi-channel pipe 1000 via socket fusion to create a fluid tight seal between the bottom cap and the one or more air channels 1050, 1052, 1054, 1056. The multi-channel pipe and attached bottom cap are inserted into the pipe at block 1914. At block 1916, a fitting having first, second, and third ports is attached to the pipe and multi-channel pipe 1000 to create a ground loop. For instance, T-fitting 1500 may be attached to both the pipe 200 and the multi-channel pipe using electro fusion as described above. The second end portion 1610 of the multi-channel pipe and the third port 1550 may be used to connect the ground loop with other components of a heating and/or cooling system.

Figure 20A:
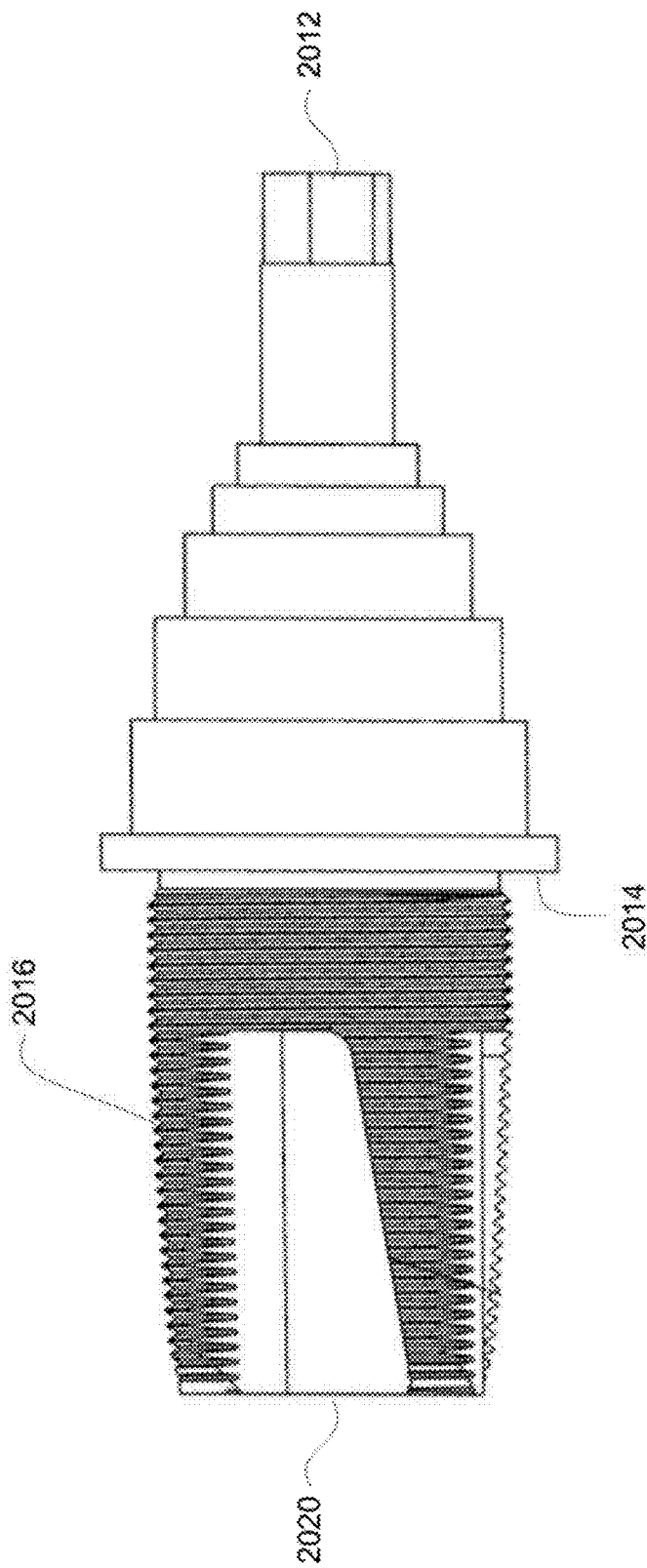
FIG. 20A is an example view of a first drill head in accordance with aspects of the disclosure.
Figure 20B:
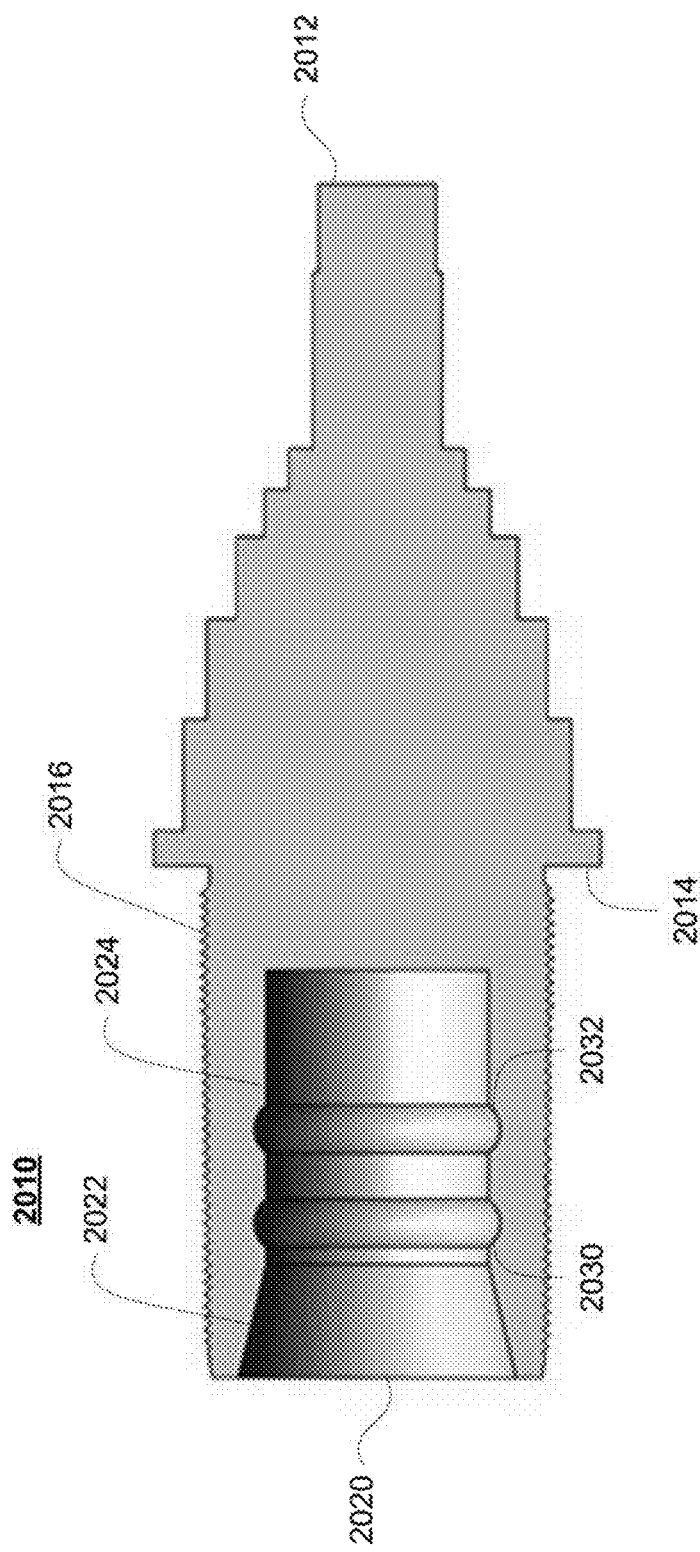
FIG. 20B is an example cross-sectional view of the first drill head of FIG. 20A in accordance with aspects of the disclosure.

Alternatively, rather than a taper lock, the locking fit may include a ball lock. As with the taper lock, the ball lock may facilitate coupling and decoupling of two drill heads. To utilize a ball lock, different first and second drill heads may be attached to the pipe and boring tools, respectively. FIG. 20A is a view of a first drill head 2010 for use with a ball lock, and FIG. 20B is an example cross sectional view of the first drill head 2010. First drill head 2010 may be compared to drill head 210 and thus includes many of the features discussed above. In this regard, drill head 210 includes a drilling portion 2012 comparable to drilling portion 212, a ridge section 2014 comparable to ridge section 310, and a thread-cutting interface 2016 comparable to thread-cutting interface 330. In this regard, drilling portion 2012 may be used to create an opening in ground material, ridge section

2014 may reduce or prevent damage to the pipe during drilling, and thread-cutting interface 2016 may be used to connect the first drill head 2010 to the pipe 200.

As with first drill head 210, the first drill head 2010 also includes an opening 2020 including a first chamber 2022 and a second chamber 2024. As shown, the first chamber 2022 has a first width that narrows toward the second chamber 2024. The second chamber 2024 has a cylindrical shape.

The second chamber may include one or more grooves. For instance, FIG. 20B depicts two grooves, a first groove 2030 and a second groove 2032. Each groove may be sized to fit a portion of a ball for an interference fit as discussed further below. In addition, the grooves may be circumferential and may be rounded or square depending upon how they are created. In addition, a stopper or pin may be placed in one or both of the grooves in order to make the grooves not fully circumferential if needed.

FIG. 21 is an example view of a second drill head 2110 for use with the ball lock. Second drill head 2110 may be compared to second drill head 860 and thus includes many of the features discussed above. For instance, second drill head 2110 includes threading 2112 arranged on the second drill head 2110 in order to connect the second drill head 2110 to the first end 830 of the tube 810 of the boring tool 630 as shown in FIG. 22. In addition, second drill head 2110 includes a drilling portion 2114 that is complementary to the shape of the second chamber 2024.

As can be seen in FIG. 21, the second drill head 2110 includes a pair of ball locks 2120, 2122 oriented opposite of one another. Each ball lock 2120, 2122 may be installed in the second drill head by drilling or machining an opening 2130, 2132 through the drilling portion 2114. The opening is drilled from a first end 2140, 2142 such that a taper 2150, 2152 is created at a second end 2160, 2162 of the opening 2130, 2132.

Referring to the cross-sectional view of second drill head 2110 of FIG. 23, when a ball 2170 is placed in the first end 2140 of the opening 2130, the taper 2150 prevents the ball from passing through the second end 2160. Similarly a ball 2172 is placed in the first end 2142 of the opening 2132, the taper 2152 prevents the ball from passing through the second end 2162. To be effective, the size of the openings at the second ends (or the diameter of the tapers) may allow for a portion of each ball to extend past the opening. For instance, referring to FIG. 24, a detail view of section H of FIG. 23, distance D may be approximately 26% of the diameter of a ball or more or less. In that regard, the angle of contact Θ between the taper and the ball at this position may be approximately 61 degrees or more or less.

After the ball, a spring 2180, 2182 is inserted in the first end 2140, 2142 of the opening 2130, 2132. Thereafter, a locking screw 2190, 2192 is threaded into the first end of the opening and towards the spring. The threading of the locking screw may be coated with a thread locking compound to prevent the locking screw from backing out of the first end of the opening. Eventually, the spring is compressed against the ball, until a desired amount of tension is reached. For instance, comparing the positioning of spring 2180 to the positioning of spring 2182 of FIG. 21, the tension is greater in ball lock 2120 than ball lock 2122 as spring 2180 is compressed more by locking screw 2190 than spring 2182 is compressed by locking screw 2192. In this example, ball locks 2120, 2122 are in a rest condition where there is no force on the ball 2170 or the ball 2172 from outside of the opening 2130 or 2132. Once both ball locks have the desired amount of tension, the second drill head 2110 may then be attached to the boring tool 630 using the threading 2112.

Figure 25:
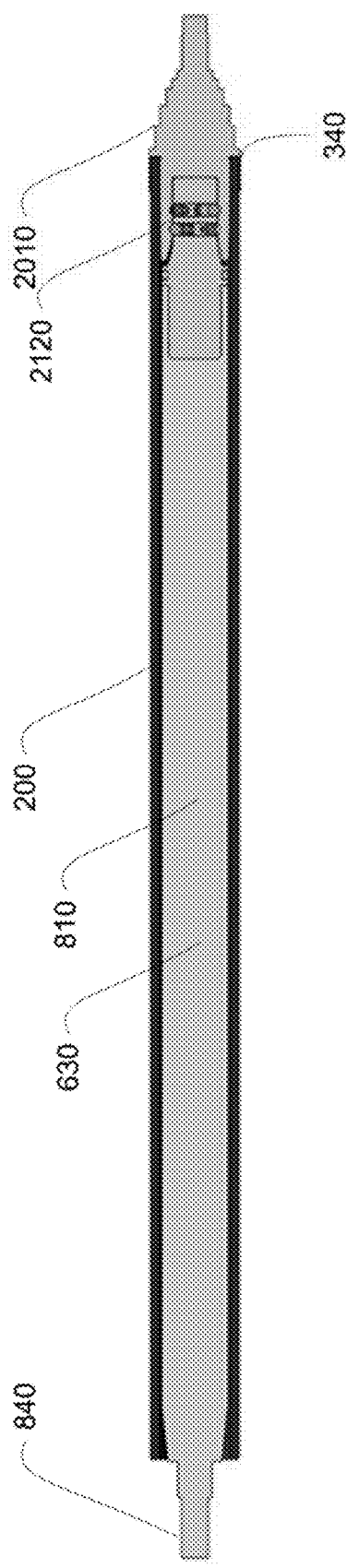
FIG. 25 is an example cross sectional view of the pipe and attached first drill head of FIG. 20A with the boring tool of FIG. 22 inserted therein.
Figure 26:
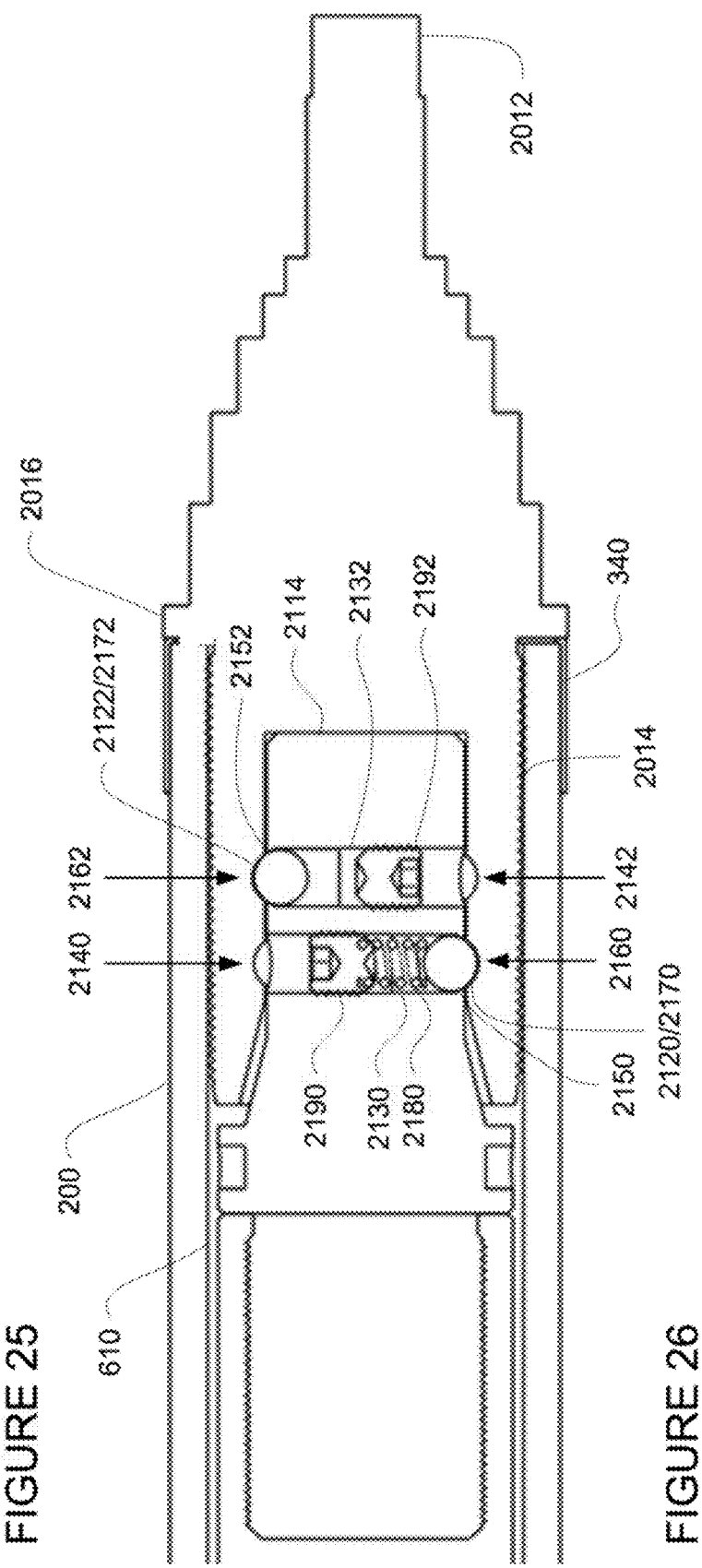
FIG. 26 is another example cross sectional view of the pipe and attached first drill head of FIG. 20A with the boring tool of FIG. 22 inserted therein.

As with the taper lock example, in the ball lock example, the second drill head is attached to the boring tool and inserted into the trailing end of the pipe until the second drill head meets with the opening in the first drill head. The boring tool may then be turned on in order to force the second drill head within the first drill head. For instance, as shown in FIG. 25, second drill head 2110 is shown attached to boring tool 630 within pipe 200 and fully inserted into first drill head 2010. FIG. 26 is a detail cross sectional view of the first end of the pipe as shown in FIG. 25. For ease of understanding, ball lock 2122 is depicted without spring 2182. As in the examples described above, collar 340 may be placed around the first end 220 of the pipe prior to attaching the first drill head 2010 to the pipe.

Figure 27:
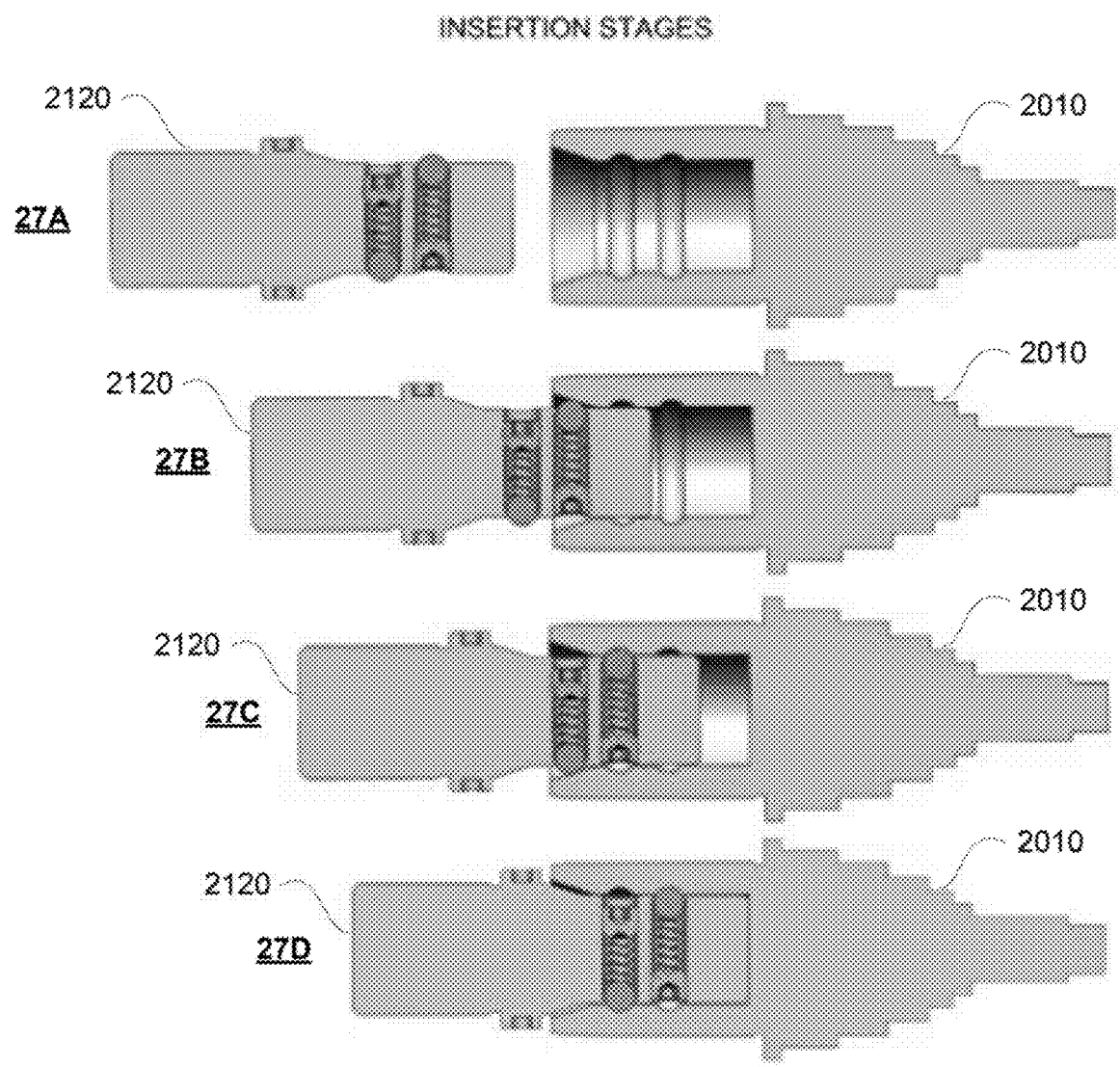
FIG. 27 is example views of insertion stages of the first drill head of FIG. 20A and the second drill head of FIG. 21 in accordance with aspects of the disclosure.

FIG. 27 includes a set of views 27A-27D depicting 4 insertion stages for inserting the second drill head 2110 into the first drill head 2010 to form the ball lock. For simplification and ease of understanding, pipe 200 and boring tool 630 are not shown. To form the ball lock, the second drill head 2110 is attached to the boring tool 630 and inserted into the tube until the second drill head 2110 is proximate to the first drill head 2010 as shown in view 27A. Next, the drilling portion 2114 is inserted into the opening 2020 as shown in view 27B. As the drilling portion 2114 passes into the first chamber 2022, the tapered shape of the first chamber guides the drilling portion 2114 and compresses the ball 2172.

Figure 28:
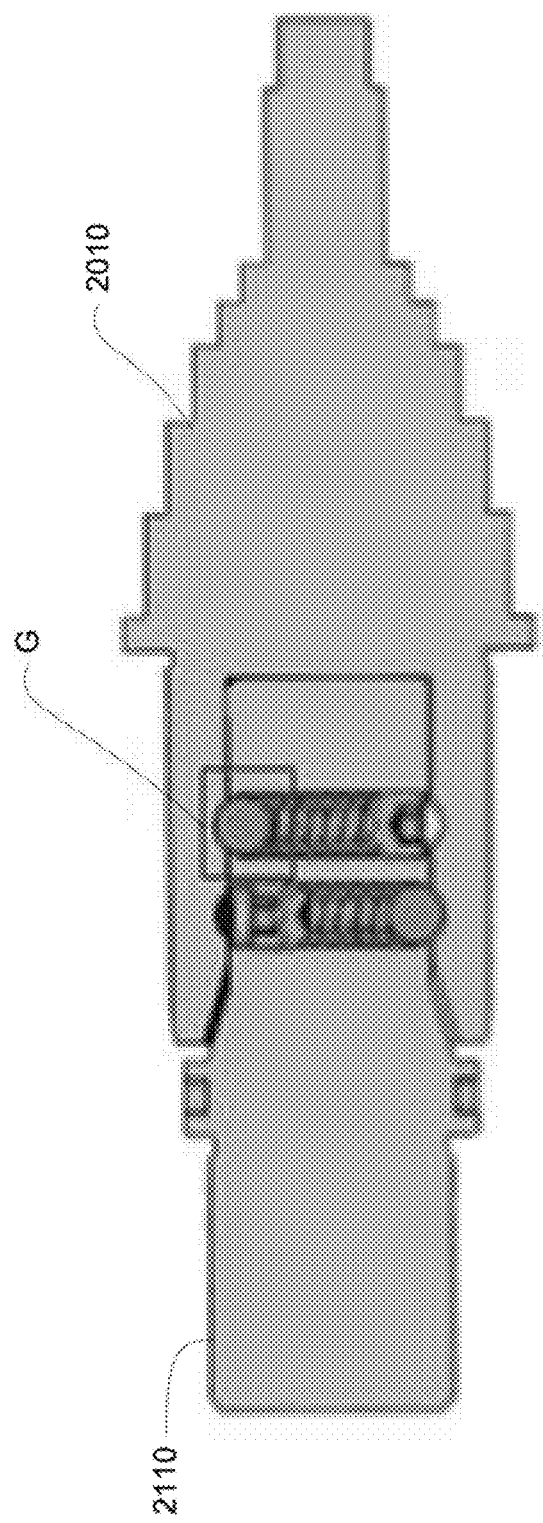
FIG. 28 is an example cross-sectional view of the second drill head of FIG. 21 inserted into the first drill head of FIG. 20A in accordance with aspects of the disclosure.
Figure 29:
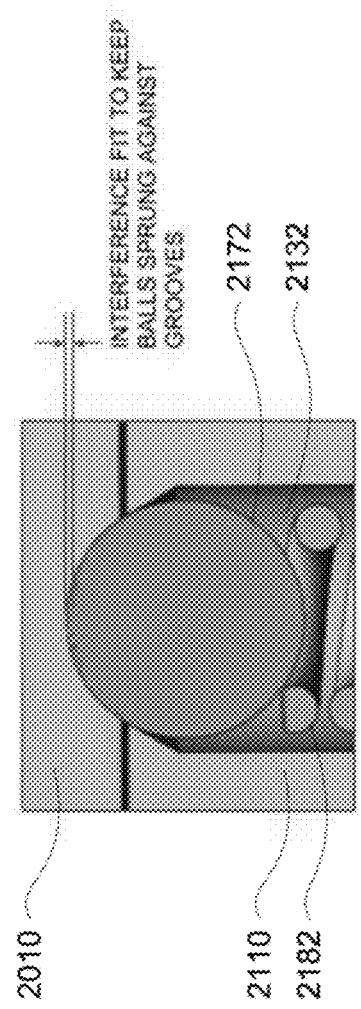
FIG. 29 is an example view of a portion of the cross-sectional view of FIG. 28 in accordance with aspects of the disclosure.

As shown in view 27C, when the ball 2172 is within the second chamber 2024 and in line with the first groove 2030, the ball moves into the first groove and decompresses. However, the ball does not fully decompress into the rest condition. This allows for some tension between the ball and the groove. In this regard, the fit between the ball and the groove is an interference fit as shown in FIG. 29 (a detail view of section G of FIG. 28). Additional force on the second drill head 2110 causes the ball to decompress again and move further into the second chamber 2024 until eventually both balls are in line with one of the first or second grooves as shown in view 27D.

As with the taper lock, the ball lock allows the first and second drill heads to remain locked together during the hammering to create the opening. Again, the hammering can continue until a desired depth of the opening is reached. The first and second drill heads may then be released from one another. The spring force on the balls may be balanced so that the return stroke does not decouple the heads but still allows the boring tool to be separated by one or more of pulling it up with the air hose or cable (or chain) while engaged in the forward direction, pulling the boring tool out using attached cable with boring tool turned off, and pulling the boring tool up with the air hose or cable while engaged in the reverse direction. This technique is used where the groove is configured with a pin as noted above to prevent full rotation of the second drill head within the first drill head, thereby allowing the line to be twisted to reverse the mole. However, allowing for full rotation of the second drill head may spread out wear on the grooves caused by the drilling, though the first drill head need only be used once.

Once the first and second drill heads are separated, the boring tool and air hose may be removed from the pipe. This allows the boring tool to be pulled out of the pipe via the air hose or by an attached cable or chain for this purpose. The ground loop installation may thereafter proceed as described in the examples above.

Alternatively, rather than a taper or ball lock, the locking fit may include a latch lock. As with the taper and ball locks, the latch lock may facilitate coupling and decoupling of two drill heads. To utilize a latch lock, first drill head 2010 may be used with a different second drill head.

Figure 30:
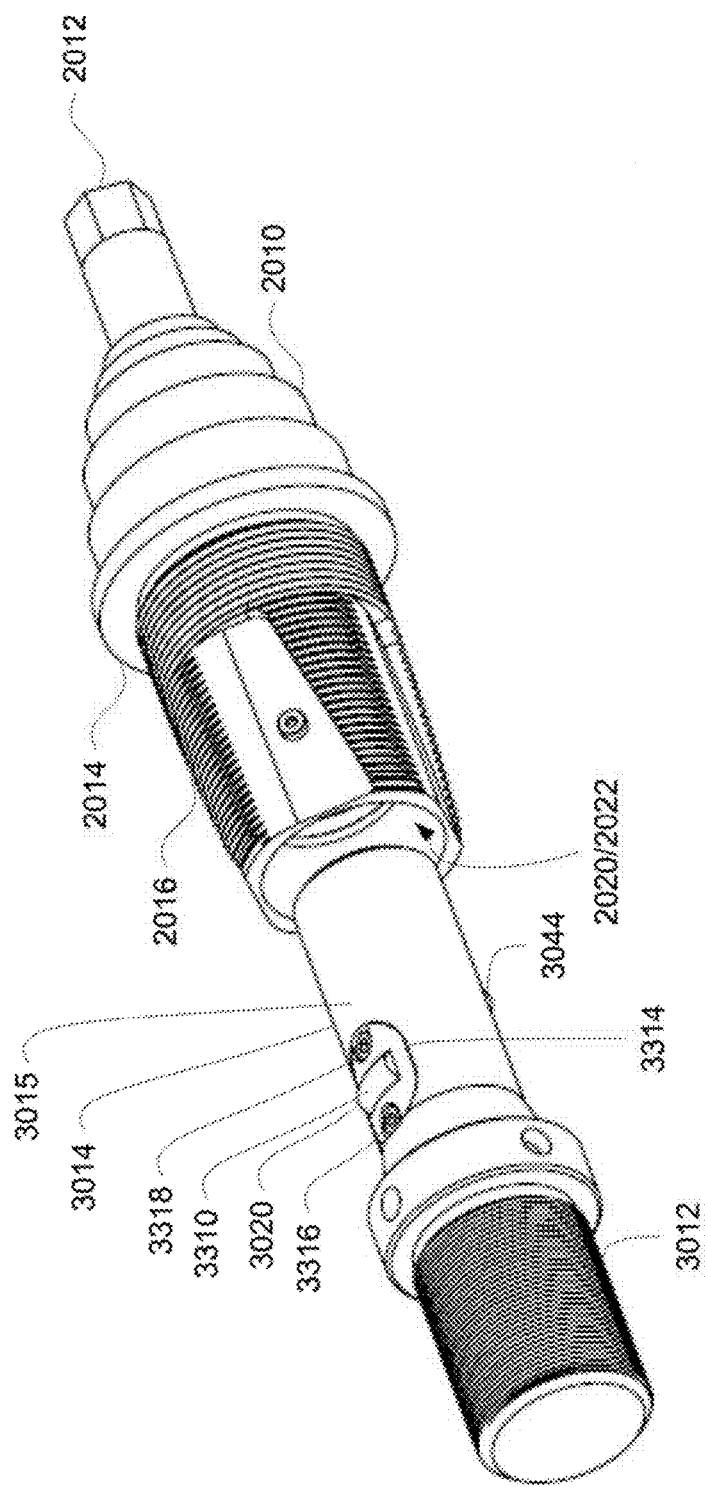
FIG. 30 is an example view of the first drill head of FIG. 20A and a second drill head, in accordance with aspects of the disclosure.

FIG. 30 is an example view of first drill head 2010 with second drill head 3010 for use with the latch lock. Second drill head 3010 may be compared to second drill heads 860, 2110 and thus includes many of the features discussed above. For instance, second drill head 3010 includes threading 3012 arranged on the second drill head 3010 in order to connect the second drill head 3010 to the first end 830 of the tube 810 of the boring tool 630 (as a reference, see FIG. 22 depicting second drill head 2110). In addition, second drill head 3010 includes a drilling portion 3014 that is complementary to the shape of the second chamber 2024.

Figure 31:
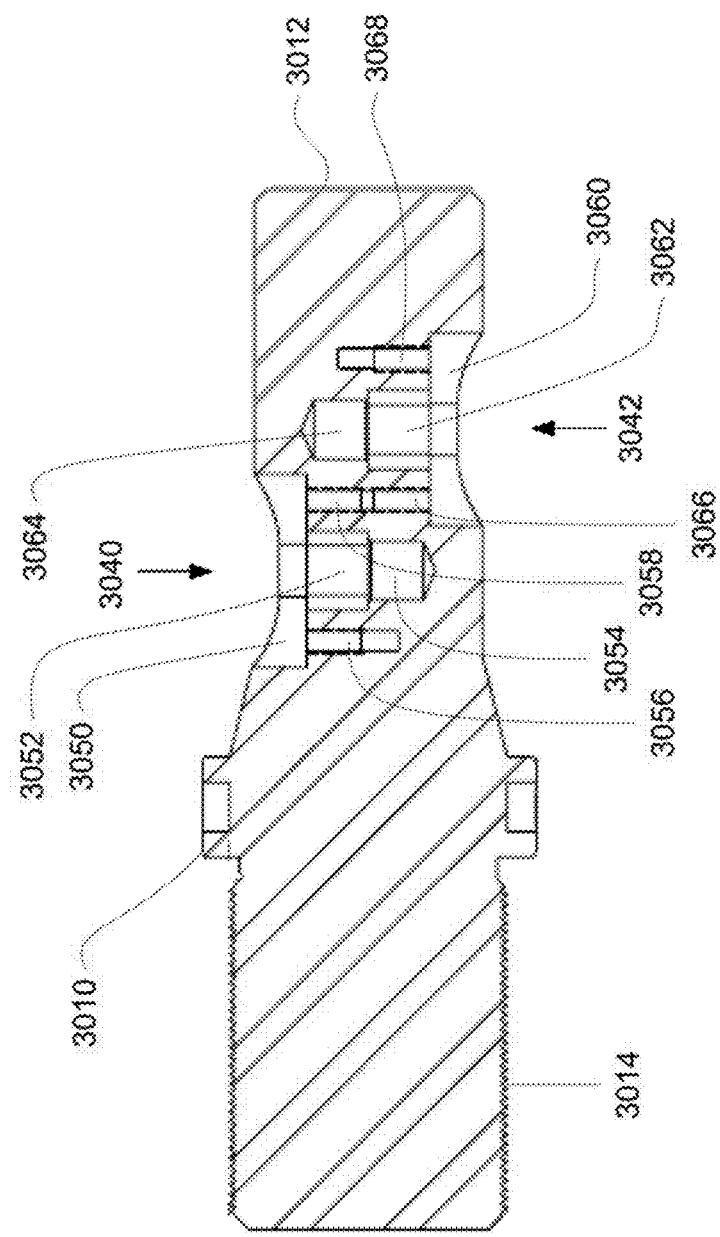
FIG. 31 is a cross-sectional view of the second drill head of FIG. 30 in accordance with aspects of the disclosure.

As can be seen in FIG. 30, the second drill head 2110 includes a pair of latch locks 3020, 3022 oriented opposite of one another, latch lock 3022 being only partially shown. To install the latch locks in the second drill head, several chambers may be machined into the drilling portion 3014. Alternatively, the chambers may be formed in a molding or casting process. Referring to FIG. 31, a cross-sectional view of second drill head 3010, a first set of chambers 3050-3058 may be drilled from a first end 3040 towards a second end 3042. As can be seen, such chambers do not pass all of the way through to the second end 3042. Similarly, a second set of chambers 3060-3068 may be drilled from the second end 3042 towards the first end 3040. Again, such chambers do not pass all of the way through to the first end 304. Each set of chambers includes a cover plate chamber 3050, 3060, a latch piece chamber 3052, 3062, a spring chamber 3054, 3064, and a pair of locking screw chambers 3056, 3058, 3066, 3068.

Figure 32:
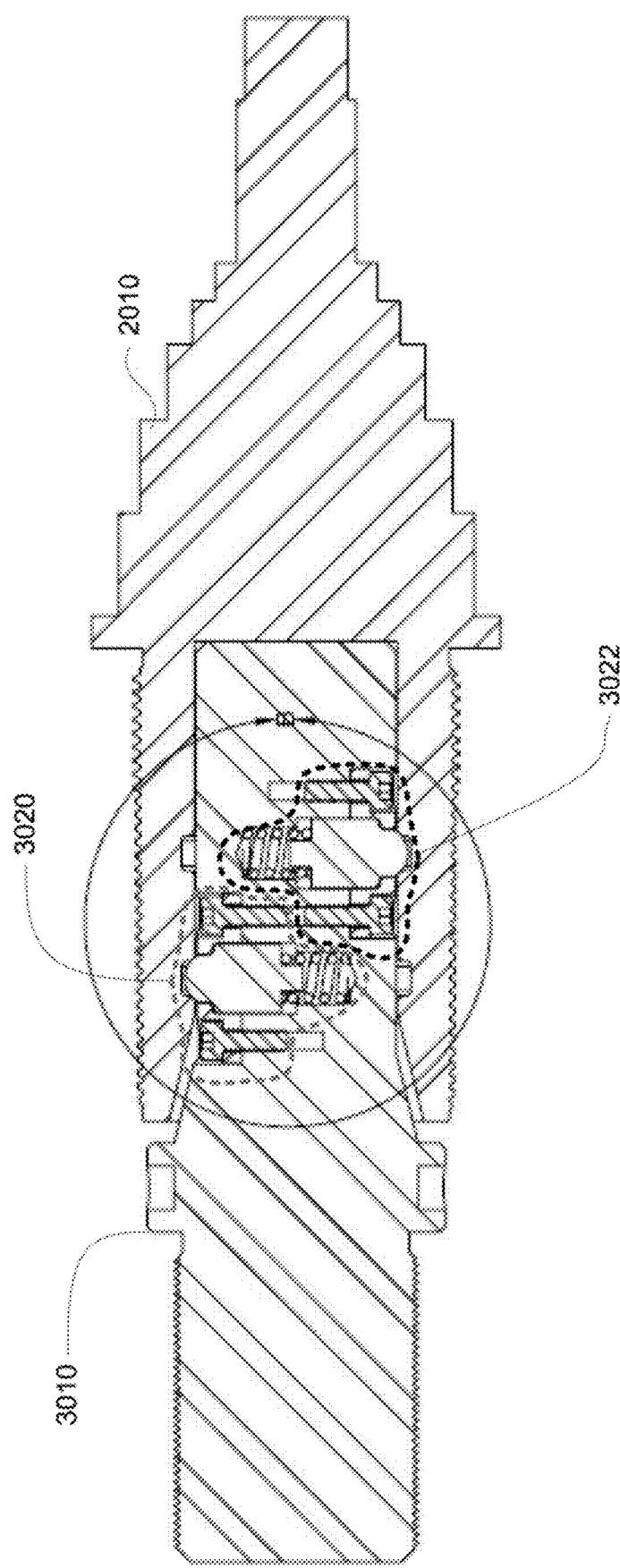
FIG. 32 is a cross-sectional view of the second drill head of FIG. 30 and a pair of latch locks in accordance with aspects of the disclosure.
Figure 33:
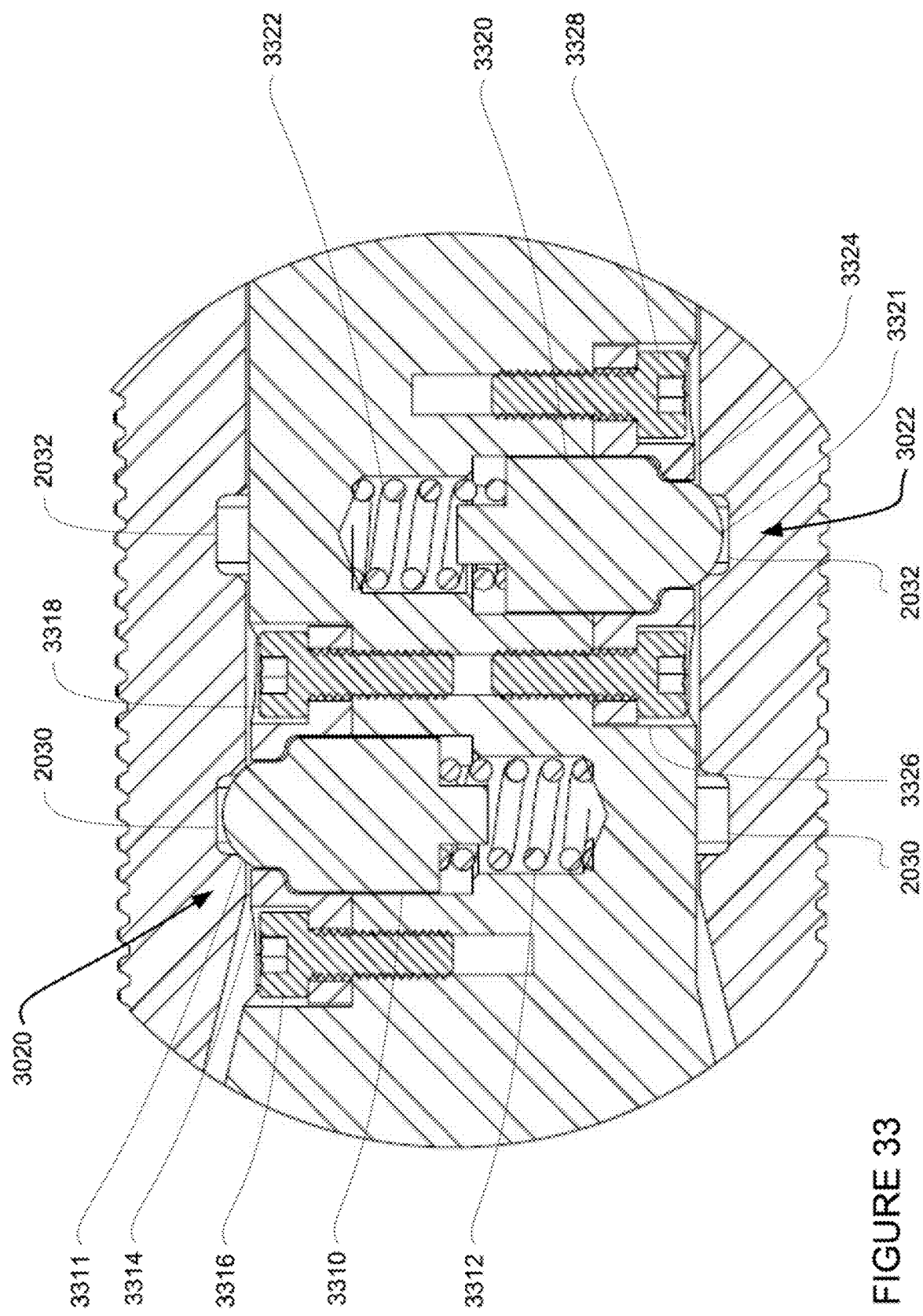
FIG. 33 is a detail view of a portion of FIG. 32 in accordance with aspects of the disclosure.

FIG. 32 is a cross sectional view of second drill head 3010 fully inserted into first drill head 2010, and FIG. 33 is a detail view of the area within portion B of FIG. 32. As shown in FIG. 33, the features of latch lock 3020 (identified within the bounds of the dashed lines in FIG. 32) include a latch piece 3310 resting over a spring 3312. Latch piece 3310 and spring 3312 are each located at least partially within latch piece chamber 3052 and spring chamber 3054. The latch piece 3310 and spring 3312 are held at least partially within the drilling portion 3012 by cover plate 3314. A latch head 3311 of the latch piece 3310 extends through a top surface 3520 (shown in FIG. 35A) of the cover plate 3314 and rests in first groove 2030. The cover plate 3314 is secured within cover plate chamber 3050 by a pair of locking screws 3316, 3318 which extend into locking screw chambers 3056, 3058.

Similarly, the features of latch lock 3022 (identified within the bounds of the dashed lines in FIG. 32) include a latch piece 3320 resting over a spring 3322. Latch piece 3320 and spring 3322 are each located at least partially within latch piece chamber 3062 and spring chamber 3064. The latch piece 3320 and spring 3312 are held at least partially within the drilling portion 3012 by cover plate 3314. A latch head 3321 of the latch piece 3320 extends through a top surface of the cover plate 3324 and rests in first groove 2030. The cover plate 3324 is secured within cover plate chamber 3060 by a pair of locking screws 3326, 3328 which extend into locking screw chambers 3066, 3068.

Figure 34B:
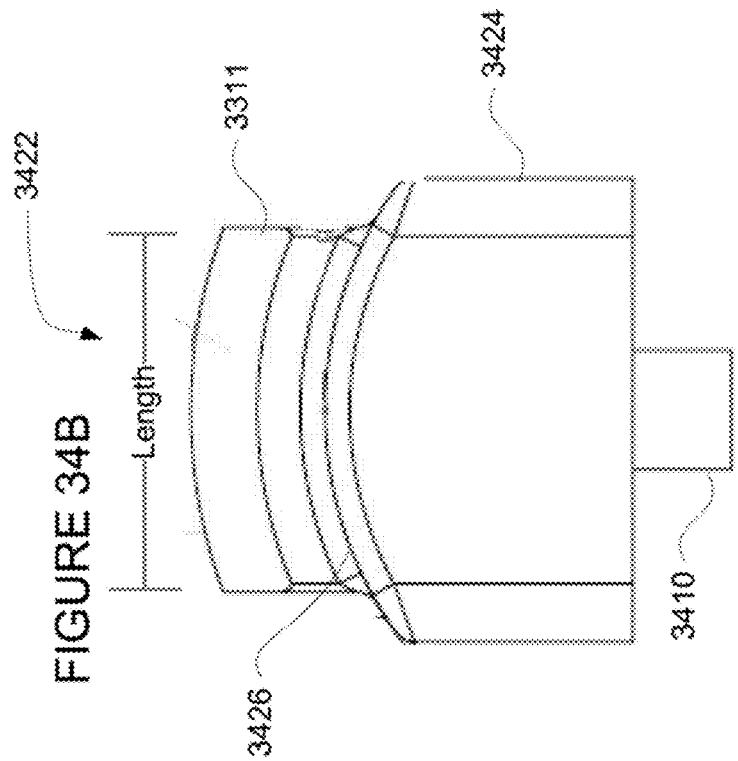
FIGS. 34A-34D are views of an example latch piece in accordance with aspects of the disclosure.
Figure 34D:
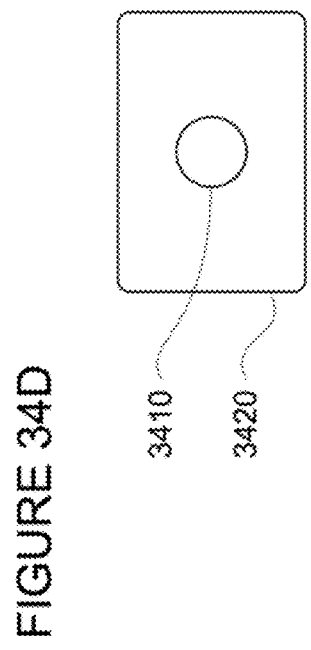
Figure 34A:
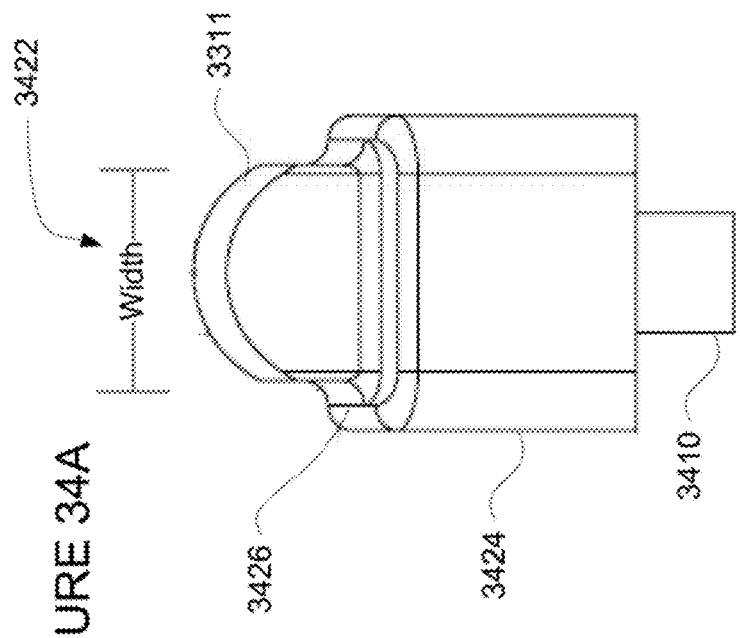
Figure 34C:
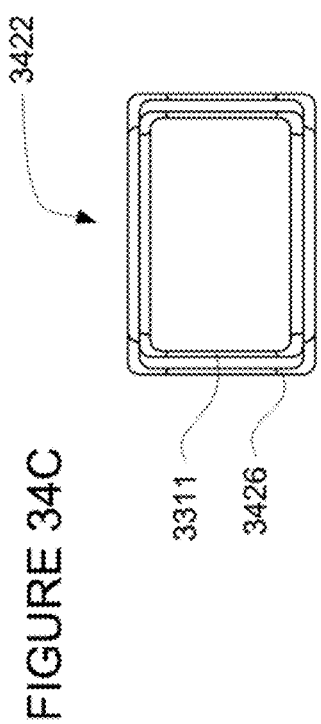

FIG. 34A and 34B are side views of the latch piece 3310, while FIGS. 34C and 34D are top and bottom views, respectively, of the latch piece 3310. As can be seen, latch piece 3310 includes a tab 3410 that extends from a bottom surface 3420 of the latch piece 3310. Between the bottom surface and a top side 3422 of the latch piece is a body portion 3424. The top side 3422 includes the latch head 3311 and a shelf area 3426 around the latch head. The width dimension of the latch head 3311 also has a semi-annular shape or a rounded cross section (from the perspective of FIG. 34A, similar to the balls 2170, 2172 of the ball locks 2120, 2122 discussed above. However, as can be seen from the perspective of FIG. 3A, the rounded shape does not form a portion of a sphere (as the balls of the ball locks discussed above), but rather and elongated rectangular shape which is also slightly curved along the length dimension (perpendicular to the width dimension), giving the length dimension a semi-annular shape as well. In addition, the radius of curvature of the length dimension is lesser than the radius of curvature of the width dimension. This greater length dimension of the latch head gives the latch piece a greater amount of surface area (than the balls of the ball locks example) to interact with the grooves of the first drill head. Thus, the exact curvature used will depend on the size and shape of the grooves of the first drill head. Although not separately show, latch piece 3320 maybe similarly constructed or identical to latch piece 3310.

Figure 35B:
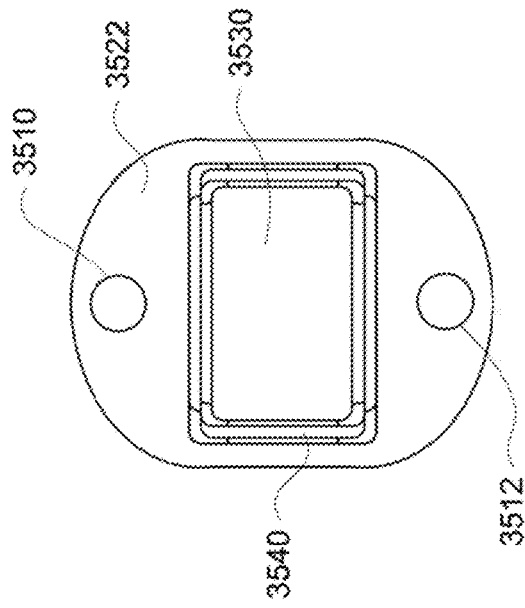
FIG. 35A-35D are views of an example cover plate in accordance with aspects of the disclosure.
Figure 35D:
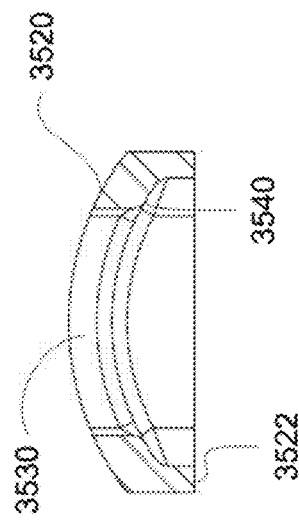
Figure 35A:
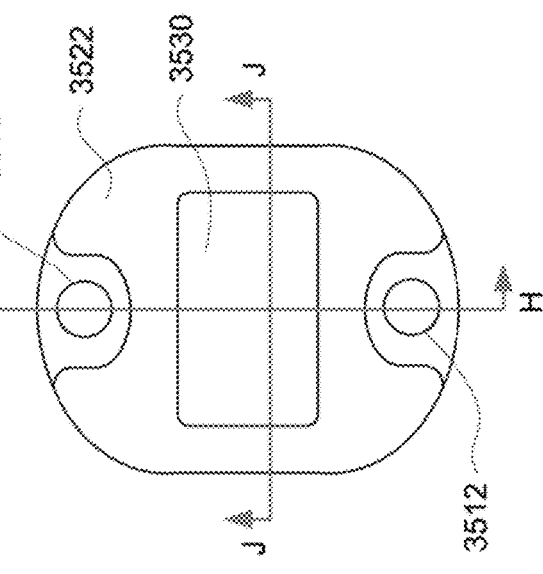
Figure 35C:
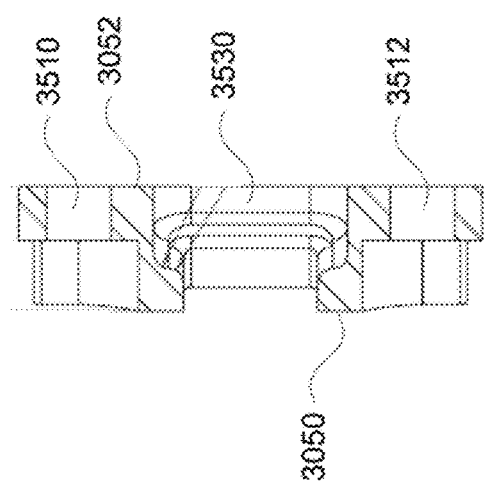

FIGS. 35A and 35B are top and bottom views, respectively, of the cover plate 3314. FIGS. 35C and 35D are cross sectional views from the perspective of H-H and J-J of FIG. 35A, respectively. As can be seen, cover plate 3314 includes a pair of screw holes 3510, 3512 that extend between the top surface 3520 and a bottom surface 3522 of the cover plate. In addition, the cover plate includes a latch piece opening 3530 side to fit the latch head 3311 (and latch head 3321) that also extends between the top surface 3520 and a bottom surface 3522 of the cover plate. The latch piece opening 3530 includes an interior flange or shelf 3540 having a complementary shape to the shelf area 3426 of latch piece 3320 (and latch piece 3310). Although not separately show, cover plate 3314 maybe similarly constructed or identical to cover plate 3314.

Thus, to install the latch lock 3020 into the second drill head 3010, spring 3312 may be placed within spring chamber 3052. Thereafter, the latch piece 3310 may be inserted into the latch piece chamber 3052 so that tab 3410 is at least partially within the spring 3312 (as shown in FIGS. 32 and 33). Thereafter, the cover plate 3314 may be placed over the latch head 3311 so that the latch head passes through the latch piece opening 3530. Locking screws 3316 and 3318 may be placed into screw holes 3510, 3512, respectively and screwed down into the locking screw chambers 3056, 3058, respectively. When the screws are fully seated, cover plate 3314 may be flush or nearly flush with the outer surface 3015 of the drilling portion 3014 (as shown in FIG. 30). The locking screws may thus secure the cover plate 3314 over the latch piece 3310, thereby preventing the latch piece from coming out of the drilling portion 3012. In addition, the spring 3312 causes a force on the bottom surface 3420 that forces the shelf area 3426 towards and against the interior shelf 3540. Thus, the interior shelf and shelf area together prevent the latch piece 3310 from moving through the latch piece opening 3530. A similar or identical process may be used to install the latch lock 3020 into the second drill head 3010. Once both latch locks are installed, the second drill head 3010 may then be attached to the boring tool 630 using the threading 3014.

As with the taper lock and ball lock examples, in the latch lock example, the second drill head is attached to the boring tool and inserted into the trailing end of the pipe until the second drill head meets with the opening in the first drill head. The boring tool may then be turned on in order to force the second drill head within the first drill head. As in the examples described above, collar 340 may be placed around the first end 220 of the pipe prior to attaching the first drill head 2010 to the pipe.

Upon insertion into the first drill head, the latch locks may function similarly to ball locks discussed above and with regard to the insertion stages of FIG. 26. To form the latch lock, the second drill head 3010 is attached to the boring tool 630 and inserted into the tube until the second drill head 3010 is proximate to the first drill head 2010 (similar to what is shown in view 27A). Next, the drilling portion 3014 is inserted into the opening 2020 (similar to what is shown in view 27B). As the drilling portion 3014 passes into the first chamber 2022, the tapered shape of the first chamber guides the drilling portion 3014 and compresses the latch head 3321 and latch piece 3320.

When the latch head 3321 is within the second chamber 2024 and in line with the first groove 2030, the latch head moves into the first groove and decompresses (similar to what is shown in view 27C). However, the latch piece 3320 does not fully decompress. This allows for some tension between the latch piece 3320 and the groove. In this regard, the fit between the latch head 3321 and the groove is an interference fit as with the example of the ball locks and as is shown in FIG. 33. Additional force on the second drill head 2110 causes the ball to decompress again and move further into the second chamber 2024 until eventually both latch heads are in line with one of the first or second grooves, similar to the example shown in view 27D and as is shown in FIGS. 32 and 33.

As with the taper lock and ball lock, the latch lock allows the first and second drill heads to remain locked together during the hammering to create the opening. Again, the hammering can continue until a desired depth of the opening is reached. The first and second drill heads may then be released from one another. As with the ball lock, the spring force on the latch pieces may be balanced so that the return stroke does not decouple the heads but still allows the boring tool to be separated by one or more of pulling it up with the air hose or cable (or chain) while engaged in the forward direction, pulling the boring tool out using attached cable with boring tool turned off, and pulling the boring tool up with the air hose or cable while engaged in the reverse direction.

Again, once the first and second drill heads are separated, the boring tool and air hose may be removed from the pipe. This allows the boring tool to be pulled out of the pipe via the air hose or by an attached cable or chain for this purpose. The ground loop installation may thereafter proceed as described in the examples above.

Although the technology described herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A system for drilling an opening in ground material, the system comprising:
   a first drill head configured as a pipe pulling drill head and configured to create the opening in the ground material;
   a second drill head configured for attachment with a boring tool, and
   a cover plate configured to secure one of a pair of latch locks to the drill head,
   wherein when attached to an end of a pipe, the first drill head is configured to pull the pipe into the opening in ground material, the first drill head includes a drilling portion and an opening opposite of the drilling portion, the opening includes a first chamber that tapers towards a second chamber, and the second drill head includes a drilling end configured for a locking fit within the second chamber,
   wherein the second drill head is configured with the pair of latch locks arranged to allow the locking fit, each latch lock including a latch head having a width dimension that is greater than a length dimension, and the latch head having a rounded shape in the width dimension and a rounded shape in the length dimension, and
   wherein the cover plate includes a latch head opening that extends from a top surface of the cover plate to a bottom surface of the cover plate, and the latch head is arranged to extend through the latch head opening and away from the top surface.

2. The system of claim 1, further comprising a spring, and wherein the cover plate includes an internal flange and the one of the latch locks includes a shelf area, and the spring is arranged to force the shelf area towards an interior shelf.

3. The system of claim 1, wherein a radius of curvature of the rounded shape in the width dimension is greater than a radius of curvature of the rounded shape in the length dimension.

4. A system for drilling an opening in ground material, the system comprising:
   a first drill head configured as a pipe pulling drill head and configured to create the opening in the ground material;
   a second drill head configured for attachment with a boring tool;
   a cover plate configured to secure one of a pair of latch locks to the drill head; and
   a screw configured to hold the cover plate to the drill head and secure the one of the latch locks to the drill head,
   wherein when attached to an end of a pipe, the first drill head is configured to pull the pipe into the opening in ground material, the first drill head includes a drilling portion and an opening opposite of the drilling portion, the opening includes a first chamber that tapers towards a second chamber, and the second drill head includes a drilling end configured for a locking fit within the second chamber,
   wherein the second drill head is configured with the pair of latch locks arranged to allow the locking fit, each latch lock including a latch head having a width dimension that is greater than a length dimension, and the latch head having a rounded shape in the width dimension and a rounded shape in the length dimension.

* * * * *